(12) United States Patent
Yang et al.

(10) Patent No.: US 11,658,780 B2
(45) Date of Patent: May 23, 2023

(54) DEMODULATION REFERENCE SIGNAL MULTIPLEXING SCHEME SELECTION FOR UPLINK TRANSMISSION

(71) Applicant: QUALCOMM Incorporated, San Diego, CA (US)

(72) Inventors: Wei Yang, San Diego, CA (US); Yi Huang, San Diego, CA (US); Wanshi Chen, San Diego, CA (US); Peter Gaal, San Diego, CA (US); Seyedkianoush Hosseini, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 16/735,402

(22) Filed: Jan. 6, 2020

(65) Prior Publication Data

US 2020/0220681 A1 Jul. 9, 2020

Related U.S. Application Data

(60) Provisional application No. 62/790,426, filed on Jan. 9, 2019.

(51) Int. Cl.
*H04L 5/00* (2006.01)
*H04L 5/02* (2006.01)

(52) U.S. Cl.
CPC ............ *H04L 5/0048* (2013.01); *H04L 5/001* (2013.01); *H04L 5/0037* (2013.01); *H04L 5/026* (2013.01)

(58) Field of Classification Search
CPC ..... H04L 27/2607; H04L 5/00; H04L 5/0051; H04L 27/26136; H04L 5/0053;
(Continued)

(56) References Cited

U.S. PATENT DOCUMENTS

| | | | |
|---|---|---|---|
| 2011/0142107 A1* | 6/2011 | Pan ...................... | H04B 7/0894 375/219 |
| 2012/0093120 A1* | 4/2012 | Ko ...................... | H04L 27/2613 370/329 |

(Continued)

FOREIGN PATENT DOCUMENTS

| | | | | |
|---|---|---|---|---|
| WO | WO-2017171314 A1 * | 10/2017 | ............... | H04L 5/00 |
| WO | WO-2018031066 A1 | 2/2018 | | |

(Continued)

OTHER PUBLICATIONS

International Search Report and Written Opinion—PCT/US2020/012601—ISA/EPO—dated Apr. 2, 2020.

(Continued)

*Primary Examiner* — Yee F Lam
(74) *Attorney, Agent, or Firm* — Holland & Hart / Qualcomm

(57) ABSTRACT

Methods, systems, and devices for wireless communications are described that support demodulation reference signal (DMRS) multiplexing scheme selection for uplink transmission. A user equipment (UE) may monitor for a parameter from a base station indicating which DMRS scheme to use. In some cases, the base station may transmit a radio resource control (RRC) parameter indicating a first DMRS scheme to the UE. The UE may select the first DMRS scheme based on receiving the RRC parameter from the base station or based on a default DMRS scheme. The UE may transmit a transmission based on the first DMRS scheme.

28 Claims, 19 Drawing Sheets

(58) Field of Classification Search
CPC ... H04L 5/0055; H04L 5/0016; H04L 5/0048; H04W 72/1289; H04W 72/1268; H04W 72/04; H04W 72/1257; H04W 72/12; H04W 72/0446; H04J 13/0003; H04J 13/004; H04J 13/18
See application file for complete search history.

(56) References Cited

U.S. PATENT DOCUMENTS

| | | | | |
|---|---|---|---|---|
| 2012/0188988 | A1* | 7/2012 | Chung | H04L 5/0016 370/335 |
| 2012/0207119 | A1* | 8/2012 | Zhang | H04L 5/0051 370/329 |
| 2017/0195096 | A1* | 7/2017 | Yamamoto | H04W 72/0446 |
| 2018/0124815 | A1* | 5/2018 | Papasakellariou | H04L 1/1861 |
| 2018/0220415 | A1* | 8/2018 | Yin | H04W 72/0413 |
| 2018/0227918 | A1* | 8/2018 | Yun | H04W 72/0453 |
| 2019/0141698 | A1* | 5/2019 | Kim | H04L 5/001 |
| 2019/0165873 | A1* | 5/2019 | Zhang | H04L 5/001 |
| 2019/0173641 | A1* | 6/2019 | Liu | H04L 1/0026 |
| 2019/0222447 | A1* | 7/2019 | Vos | H04L 5/0051 |
| 2019/0253300 | A1* | 8/2019 | Munier | H04L 5/0051 |
| 2019/0280734 | A1* | 9/2019 | Park | H04B 1/7143 |
| 2019/0327059 | A1* | 10/2019 | Ge | H04L 5/00 |
| 2019/0349168 | A1* | 11/2019 | Liu | H04W 72/042 |
| 2019/0356442 | A1* | 11/2019 | Ren | H04L 5/0048 |
| 2019/0373613 | A1* | 12/2019 | Harada | H04L 5/0078 |
| 2020/0259576 | A1* | 8/2020 | Saito | H04J 1/02 |
| 2020/0295979 | A1* | 9/2020 | Saito | H04W 74/004 |
| 2021/0185706 | A1* | 6/2021 | Park | H04L 27/2607 |

FOREIGN PATENT DOCUMENTS

| | | |
|---|---|---|
| WO | WO-2018174546 A1 | 9/2018 |
| WO | WO-2018231030 A1 * 12/2018 | ............ H04W 72/04 |

OTHER PUBLICATIONS

Qualcomm Incorporated: "Lower PAPR Reference Signals", 3GPP Draft, 3GPP TSG RAN WG1 Meeting #95, R1-1813898, Lower PAPR Reference Signals, 3rd Generation Partnership Project (3GPP), Mobile Competence Centre; 650, Route Des Lucioles; F-06921 Sophia-Antipolis Cedex; France, vol. RAN WG1, No. Spokane, WA, USA; Nov. 12, 2018-Nov. 16, 2018, Nov. 11, 2018 (Nov. 11, 2018), XP051555798, 25 pages. Retrieved from the Internet: URL: http://www.3gpp.org/ftp/Meetings%5F3GPP%5FSYNC/RAN1/Docs/R1%2D1813898%2Ezip [retrieved on Nov. 11, 2018], Section 3, p. 18.

* cited by examiner

DEMODULATION REFERENCE SIGNAL MULTIPLEXING SCHEME SELECTION FOR UPLINK TRANSMISSION

CROSS REFERENCE

The present Application for Patent claims the benefit of U.S. Provisional Patent Application No. 62/790,426 by YANG et al., entitled "DEMODULATION REFERENCE SIGNAL MULTIPLEXING SCHEME SELECTION FOR UPLINK TRANSMISSION," filed Jan. 9, 2019, assigned to the assignee hereof, and expressly incorporated by reference in its entirety.

BACKGROUND

The following relates generally to wireless communications, and more specifically to demodulation reference signal multiplexing scheme selection for uplink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as LTE or LTE-Advanced (LTE-A), an uplink demodulation reference signal (DMRS) is transmitted by a UE to a base station via a physical uplink control channel (PUCCH) or physical uplink shared channel (PUSCH) using a set of uplink resources. The DMRS may be generated using a sequence known by each of the UE and the base station. The UE may generate a DMRS transmission using the sequence and may transmit the DMRS transmission within the set of uplink resources. The base station may receive the DMRS signal and estimate a wireless channel between the base station and the UE based on the received signal generated using the known sequence. The base station may use the channel estimate to correct distortions to transmissions via the wireless signal for decoding of uplink transmissions by the UE. However, conventional DMRS transmission techniques are deficient.

SUMMARY

The described techniques relate to improved methods, systems, devices, or apparatuses that support demodulation reference signal (DMRS) multiplexing scheme selection for uplink transmission. Generally, the described techniques provide for a base station to receive multiple DMRS signals from different UEs on a same uplink resource (e.g., DMRS multiplexing). The base station may indicate which DMRS scheme of multiple different DMRS schemes a set of UEs is to apply, and a respective index within the indicated DMRS scheme assigned to each of the UEs. Based on the indicated DMRS scheme and assigned index, each of the UEs may apply an orthogonal cover code (OCC) (e.g., an intra-symbol time domain OCC (TD-OCC)) and/or a cyclic shift (e.g., a time domain (TD) cyclic shift) to a base sequence to generate a DMRS sequence that is orthogonal to each DMRS sequence generated by the other UEs in the set. The UEs may use a respective one of the orthogonal sequences to generate DMRS transmissions to send to the base station. In some cases, the base station may not indicate a DMRS scheme to the UE, or the UE may not receive an indication of a DMRS scheme from the base station, and in those instances the UE may transmit according to a default DMRS scheme. Thus, the base station may configure more than one UE to transmit orthogonal DMRSs within a same uplink resource or the UEs may use a same default DMRS scheme. When each UE generates a DMRS transmission that is orthogonal to the DMRS transmissions of the other UEs, the base station may use the orthogonal DMRS sequences to differentiate simultaneous transmissions within the same uplink resources from the respective UEs.

A method of wireless communication by a UE is described. The method may include monitoring for a parameter indicating which demodulation reference signal scheme of a set of demodulation reference signal schemes to use, selecting a first demodulation reference signal scheme of the set of demodulation reference signal schemes based on the monitoring, and transmitting a transmission based on the first demodulation reference signal scheme.

An apparatus for wireless communication by a UE is described. The apparatus may include a processor, memory in electronic communication with the processor, and instructions stored in the memory. The instructions may be executable by the processor to cause the apparatus to monitor for a parameter indicating which demodulation reference signal scheme of a set of demodulation reference signal schemes to use, select a first demodulation reference signal scheme of the set of demodulation reference signal schemes based on the monitoring, and transmit a transmission based on the first demodulation reference signal scheme.

Another apparatus for wireless communication by a UE is described. The apparatus may include means for monitoring for a parameter indicating which demodulation reference signal scheme of a set of demodulation reference signal schemes to use, selecting a first demodulation reference signal scheme of the set of demodulation reference signal schemes based on the monitoring, and transmitting a transmission based on the first demodulation reference signal scheme.

A non-transitory computer-readable medium storing code for wireless communication by a UE is described. The code may include instructions executable by a processor to monitor for a parameter indicating which demodulation reference signal scheme of a set of demodulation reference signal schemes to use, select a first demodulation reference signal scheme of the set of demodulation reference signal schemes based on the monitoring, and transmit a transmission based on the first demodulation reference signal scheme.

In some examples of the method, apparatuses, and non-transitory computer-readable medium described herein, monitoring for the parameter further may include operations, features, means, or instructions for receiving the parameter that indicates the first demodulation reference signal scheme.

Some examples of the method, apparatuses, and non-transitory computer-readable medium described herein may further include operations, features, means, or instructions for receiving a first index assigned to the UE of a set of different indexes, and identifying an intra-symbol time domain orthogonal cover code, a first cyclic shift for a first demodulation reference signal symbol period, and a second cyclic shift for a second demodulation reference signal symbol period based on the first index.

In some examples of the method, apparatuses, and non-transitory computer-readable medium described herein, transmitting the transmission further may include operations, features, means, or instructions for transmitting a first demodulation reference signal transmission using the intra-symbol time domain orthogonal cover code having the first cyclic shift in the first demodulation reference signal symbol period, and transmitting a second demodulation reference signal transmission using the intra-symbol time domain orthogonal cover code having the second cyclic shift in the second demodulation reference signal symbol period, the first cyclic shift differing from the second cyclic shift.

Some examples of the method, apparatuses, and non-transitory computer-readable medium described herein may further include operations, features, means, or instructions for receiving a first index assigned to the UE of a set of different indexes, and identifying a first intra-symbol time domain orthogonal cover code for a first demodulation reference signal symbol period and a second intra-symbol time domain orthogonal cover code for a second demodulation reference signal symbol period based on the first index.

In some examples of the method, apparatuses, and non-transitory computer-readable medium described herein, transmitting the transmission further may include operations, features, means, or instructions for transmitting a first demodulation reference signal transmission using the first intra-symbol time domain orthogonal cover code in the first demodulation reference signal symbol period, and transmitting a second demodulation reference signal transmission using the second intra-symbol time domain orthogonal cover code in the second demodulation reference signal symbol period, the first intra-symbol time domain orthogonal cover code differing from the second intra-symbol time domain orthogonal cover code.

In some examples of the method, apparatuses, and non-transitory computer-readable medium described herein, identifying the first intra-symbol time domain orthogonal cover code and the second intra-symbol time domain orthogonal cover code further may include operations, features, means, or instructions for identifying an index of the first intra-symbol time domain orthogonal cover code based on a symbol index of the first demodulation reference signal symbol period and the first index, and identifying an index of the second intra-symbol time domain orthogonal cover code based on a symbol index of the second demodulation reference signal symbol period and the first index.

Some examples of the method, apparatuses, and non-transitory computer-readable medium described herein may further include operations, features, means, or instructions for receiving a first index assigned to the UE of a set of different indexes, identifying a first intra-symbol time domain orthogonal cover code hopping pattern of a set of intra-symbol time domain orthogonal cover code hopping patterns based on the first index, and transmitting a set of transmissions in accordance with the first intra-symbol time domain orthogonal cover code hopping pattern.

In some examples of the method, apparatuses, and non-transitory computer-readable medium described herein, the set of transmissions may be a set of control channel transmissions.

In some examples of the method, apparatuses, and non-transitory computer-readable medium described herein, the set of transmissions may be a set of shared data channel transmissions.

In some examples of the method, apparatuses, and non-transitory computer-readable medium described herein, transmitting the transmission further may include operations, features, means, or instructions for transmitting a shared data channel transmission including a demodulation reference signal generated in accordance with the first demodulation reference signal scheme.

In some examples of the method, apparatuses, and non-transitory computer-readable medium described herein, transmitting the transmission further may include operations, features, means, or instructions for transmitting a control channel transmission including a demodulation reference signal generated in accordance with the first demodulation reference signal scheme.

Some examples of the method, apparatuses, and non-transitory computer-readable medium described herein may further include operations, features, means, or instructions for generating the transmission based on a $\pi/2$ binary phase shift keying modulation scheme.

In some examples of the method, apparatuses, and non-transitory computer-readable medium described herein, the transmission may be an uplink transmission to a base station.

In some examples of the method, apparatuses, and non-transitory computer-readable medium described herein, selecting the first demodulation reference signal scheme further may include operations, features, means, or instructions for selecting a defined demodulation reference signal scheme based on the monitoring indicating that the parameter may have not been received.

In some examples of the method, apparatuses, and non-transitory computer-readable medium described herein, the set of demodulation reference signal schemes includes an intra-symbol time domain orthogonal cover code scheme and a time domain cyclic shift scheme.

Some examples of the method, apparatuses, and non-transitory computer-readable medium described herein may further include operations, features, means, or instructions for determining a base demodulation reference signal sequence, and generating an orthogonal demodulation reference signal sequence by applying an intra-symbol time domain orthogonal cover code or a time domain cyclic shift to the base demodulation reference signal sequence based on the first demodulation reference signal scheme.

In some examples of the method, apparatuses, and non-transitory computer-readable medium described herein, the parameter may be a radio resource control parameter.

In some examples of the method, apparatuses, and non-transitory computer-readable medium described herein, the parameter may be a radio resource control parameter that separately configures a demodulation reference signal scheme for a shared data channel and a demodulation reference signal scheme for a control channel.

A method of wireless communication by a base station is described. The method may include transmitting a parameter indicating that a UE is to use a first demodulation reference signal scheme of a set of demodulation reference signal schemes and monitoring for a transmission from the UE generated based on the first demodulation reference signal scheme.

An apparatus for wireless communication by a base station is described. The apparatus may include a processor, memory in electronic communication with the processor, and instructions stored in the memory. The instructions may be executable by the processor to cause the apparatus to transmit a parameter indicating that a UE is to use a first demodulation reference signal scheme of a set of demodulation reference signal schemes and monitor for a transmission from the UE generated based on the first demodulation reference signal scheme.

Another apparatus for wireless communication by a base station is described. The apparatus may include means for transmitting a parameter indicating that a UE is to use a first demodulation reference signal scheme of a set of demodulation reference signal schemes and monitoring for a transmission from the UE generated based on the first demodulation reference signal scheme.

A non-transitory computer-readable medium storing code for wireless communication by a base station is described. The code may include instructions executable by a processor to transmit a parameter indicating that a UE is to use a first demodulation reference signal scheme of a set of demodulation reference signal schemes and monitor for a transmission from the UE generated based on the first demodulation reference signal scheme.

Some examples of the method, apparatuses, and non-transitory computer-readable medium described herein may further include operations, features, means, or instructions for transmitting a first index assigned to the UE of a set of different indexes that indicates an intra-symbol time domain orthogonal cover code, a first cyclic shift for a first demodulation reference signal symbol period, and a second cyclic shift for a second demodulation reference signal symbol period.

In some examples of the method, apparatuses, and non-transitory computer-readable medium described herein, monitoring for the transmission further may include operations, features, means, or instructions for receiving a first demodulation reference signal transmission generated using the intra-symbol time domain orthogonal cover code having the first cyclic shift in the first demodulation reference signal symbol period, and receiving a second demodulation reference signal transmission generated using the intra-symbol time domain orthogonal cover code having the second cyclic shift in the second demodulation reference signal symbol period, the first cyclic shift differing from the second cyclic shift.

Some examples of the method, apparatuses, and non-transitory computer-readable medium described herein may further include operations, features, means, or instructions for transmitting a second index assigned to a second UE of the set of different indexes that indicates a second intra-symbol time domain orthogonal cover code that differs from the intra-symbol time domain orthogonal cover code.

Some examples of the method, apparatuses, and non-transitory computer-readable medium described herein may further include operations, features, means, or instructions for transmitting a first index assigned to the UE of a set of different indexes that indicates a first intra-symbol time domain orthogonal cover code for a first demodulation reference signal symbol period and a second intra-symbol time domain orthogonal cover code for a second demodulation reference signal symbol period based on the first index.

In some examples of the method, apparatuses, and non-transitory computer-readable medium described herein, monitoring for the transmission further may include operations, features, means, or instructions for receiving a first demodulation reference signal transmission generated using the first intra-symbol time domain orthogonal cover code in the first demodulation reference signal symbol period, and receiving a second demodulation reference signal transmission generated using the second intra-symbol time domain orthogonal cover code in the second demodulation reference signal symbol period, the first intra-symbol time domain orthogonal cover code differing from the second intra-symbol time domain orthogonal cover code.

In some examples of the method, apparatuses, and non-transitory computer-readable medium described herein, monitoring for the transmission further may include operations, features, means, or instructions for receiving a shared data channel transmission including a demodulation reference signal generated in accordance with the first demodulation reference signal scheme, and demodulating the shared data channel transmission based on the demodulation reference signal.

In some examples of the method, apparatuses, and non-transitory computer-readable medium described herein, monitoring for the transmission further may include operations, features, means, or instructions for receiving a control channel transmission including a demodulation reference signal generated in accordance with the first demodulation reference signal scheme, and demodulating the control channel transmission based on the demodulation reference signal.

Some examples of the method, apparatuses, and non-transitory computer-readable medium described herein may further include operations, features, means, or instructions for transmitting a first index assigned to the UE of a set of different indexes that indicates a first intra-symbol time domain orthogonal cover code hopping pattern of a set of intra-symbol time domain orthogonal cover code hopping patterns, and receiving a set of transmissions generated in accordance with the first intra-symbol time domain orthogonal cover code hopping pattern.

In some examples of the method, apparatuses, and non-transitory computer-readable medium described herein, the set of transmissions may be a set of control channel transmissions.

In some examples of the method, apparatuses, and non-transitory computer-readable medium described herein, the set of transmissions may be a set of shared data channel transmissions.

In some examples of the method, apparatuses, and non-transitory computer-readable medium described herein, monitoring for the transmission further may include operations, features, means, or instructions for receiving the transmission including a demodulation reference signal generated in accordance with the first demodulation reference signal scheme, and demodulating the transmission based on a $\pi/2$ binary phase shift keying modulation scheme and the demodulation reference signal.

In some examples of the method, apparatuses, and non-transitory computer-readable medium described herein, the transmission may be an uplink transmission from the UE to the base station.

In some examples of the method, apparatuses, and non-transitory computer-readable medium described herein, the set of demodulation reference signal schemes includes an intra-symbol time domain orthogonal cover code scheme and a time domain cyclic shift scheme.

Some examples of the method, apparatuses, and non-transitory computer-readable medium described herein may further include operations, features, means, or instructions for transmitting an indicator of a base demodulation reference signal sequence to a first UE and a second UE, an indicator of a first index assigned to the first UE and an indicator of a second index assigned to the second UE, decoding a transmission resource to decode a first transmission from the first UE based on the base demodulation reference signal sequence and the first index, and decoding the transmission resource to decode a second transmission from the second UE based on the base demodulation reference signal sequence and the second index.

In some examples of the method, apparatuses, and non-transitory computer-readable medium described herein, decoding the transmission resource to decode the first transmission from the first UE further may include operations, features, means, or instructions for generating a first orthogonal demodulation reference signal sequence based on the base demodulation reference signal sequence and the first index, and decoding the transmission resource to decode the first transmission from the first UE based on the first orthogonal demodulation reference signal sequence.

In some examples of the method, apparatuses, and non-transitory computer-readable medium described herein, decoding the transmission resource to decode the second transmission from the second UE further may include operations, features, means, or instructions for generating a second orthogonal demodulation reference signal sequence based on the base demodulation reference signal sequence and the second index, and decoding the transmission resource to decode the second transmission from the second UE based on the second orthogonal demodulation reference signal sequence.

In some examples of the method, apparatuses, and non-transitory computer-readable medium described herein, the parameter may be a radio resource control parameter.

In some examples of the method, apparatuses, and non-transitory computer-readable medium described herein, the parameter may be a radio resource control parameter that separately configures a demodulation reference signal scheme for a shared data channel and a demodulation reference signal scheme for a control channel.

DETAILED DESCRIPTION

Figure 1:
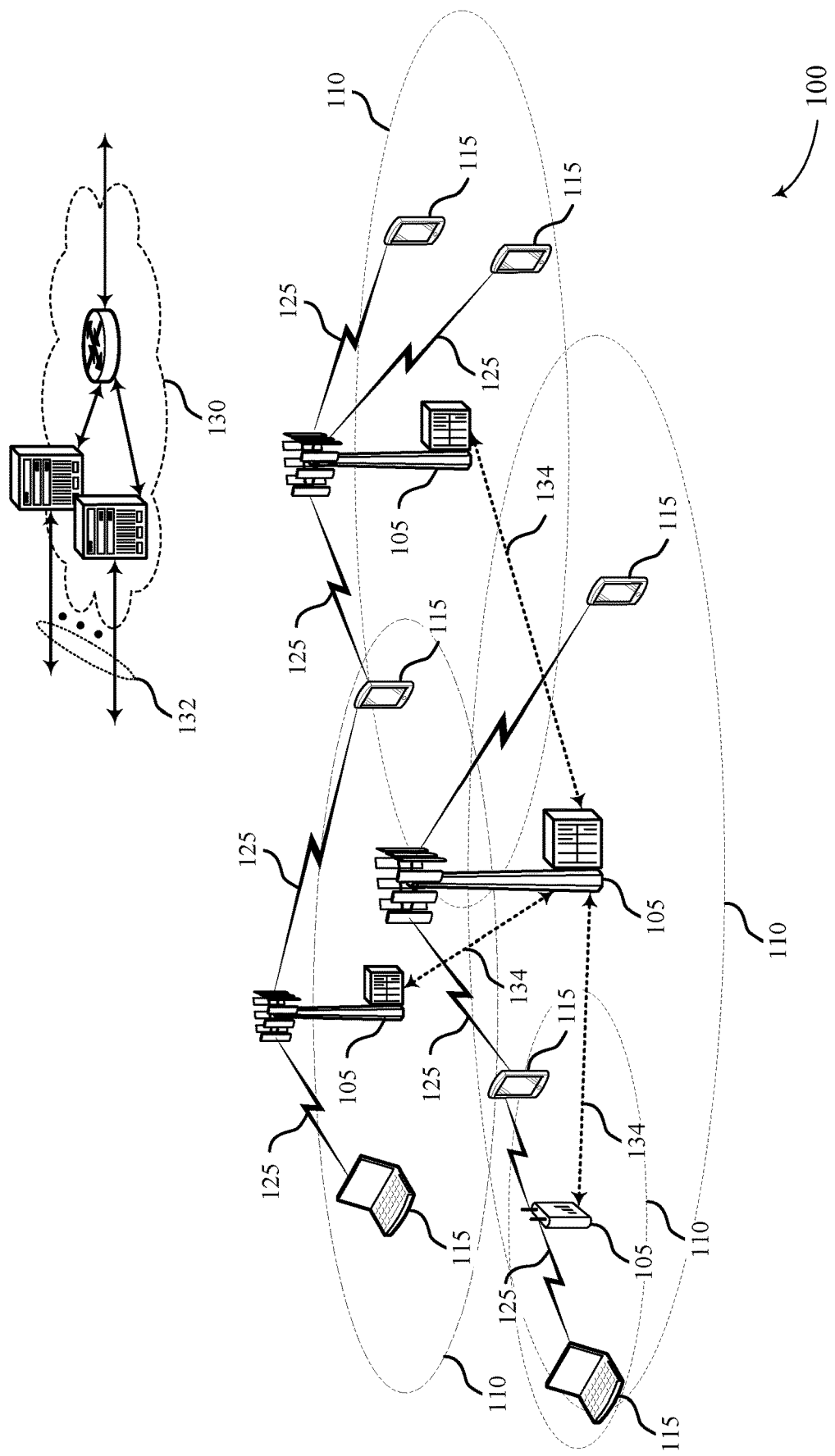
FIG. 1 illustrates an example of a system for wireless communications in accordance with aspects of the present disclosure.

Generally, the described techniques provide for demodulation reference signal (DMRS) multiplexing scheme selection for uplink transmission. In some wireless communications systems, an uplink DMRS is transmitted by a user equipment (UE) to a base station via a physical uplink control channel (PUCCH) or a physical uplink shared channel (PUSCH). In some cases, the base station may support multiplexing multiple UEs on the same transmission resource for uplink transmissions. For example, the base station may support uplink multi-user multiple-input, multiple-output (MIMO) transmissions. The base station may receive a DMRS from more than one UE using the same uplink resources (e.g., at a same time and by a same frequency resource). In order to reduce interference between DMRSs being transmitted by more than one UE on a same uplink resource, a base station may indicate which of multiple DMRS schemes to apply (e.g., an intra-symbol time domain orthogonal cover code (TD-OCC) DMRS multiplexing scheme or a time domain (TD) cyclic shift DMRS multiplexing scheme), and configure multiple UEs with a base DMRS sequence and a different index within the indicated DMRS scheme.

Each UE may apply an orthogonal cover code (OCC) (e.g., an intra-symbol TD-OCC) and/or a cyclic shift (e.g., a TD-cyclic shift) to a base DMRS sequence within the indicated DMRS scheme based on their respective index to generate a DMRS sequence that is orthogonal to the DMRS sequences generated by the other UEs. Each UE may thus generate a DMRS transmission that is orthogonal to the DMRS transmissions of the other UEs, and hence the base station may use the orthogonal DMRS sequences to differentiate simultaneous transmissions within the same uplink resources from the respective UEs.

A base station may support DMRS schemes that utilize both intra-symbol TD-OCCs and TD-cyclic shifts in order to multiplex the DMRSs of multiple UEs on the same resource. A base station may configure a radio resource control (RRC) parameter to indicate to each UE which DMRS scheme to use. For example, the base station may transmit an RRC parameter indicating to apply a TD-OCC DMRS scheme or a TD-cyclic shift DMRS scheme. The base station may also configure a set of UEs with a base DMRS sequence that each of the UEs uses to generate an orthogonal DMRS sequence.

Each UE in the set may apply a specific TD-OCC or TD-cyclic shift to the base DMRS sequence to generate a DMRS sequence that is orthogonal to the DMRS sequences generated by the other UEs in the set and may modulate its orthogonal DMRS sequence to generate a DMRS transmission (e.g., a π/2 binary phase shift keying modulated uplink transmission). Thus, the UE may transmit the DMRS according to the indicated scheme and the base station may monitor for the DMRS according to the indicated scheme. Because the DMRS sequences generated by the UEs in the set are orthogonal to one another, the UEs may transmit in the same transmission resources and the base station may use the orthogonal base sequences to differentiate simultaneous uplink transmissions from the respective UEs in the set.

In some cases, the base station may configure the RRC parameter separately for PUSCH DMRS transmissions and PUCCH DMRS transmissions. Further, there may be a default DMRS scheme utilized by each UE. In the absence of receiving an RRC parameter from the base station, a UE may transmit the DMRS according to a default DMRS scheme. In some cases, the default DMRS scheme may be different for PUCCH DMRSs and PUSCH DMRSs.

In some examples, a UE may transmit more than one DMRS sequence within a same uplink transmission using a TD-cyclic shift DMRS multiplexing scheme. For example, the UE may transmit two DMRS sequences on two different orthogonal frequency division multiplexing (OFDM) symbols within a same PUCCH transmission. In a first case, the base station may configure each UE in a set for DMRS cyclic shift hopping to achieve DMRS sequence randomization. That is, the base station may configure a UE to transmit DMRSs by applying a first TD-cyclic shift to a base sequence for a first DMRS transmission and a second TD-cyclic shift to a base sequence for a second DMRS transmission within the same transmission time interval (TTI). The base station may configure a set of UEs to apply different TD-cyclic shifts to a base sequence to achieve orthogonalization between DMRSs received from different UEs and to achieve randomization between DMRSs received from a same UE at different times within a TTI. For example, if four UEs are multiplexed for DMRS transmission on a same resource block, the base station may configure each UE to utilize a unique TD-cyclic shift for a first DMRS transmission (e.g., a cyclic shift of 0, 3, 6, and 9 for the first, second, third, and fourth UE respectively). The base station may configure each of the four UEs to utilize a different cyclic shift in a second DMRS transmission within the same uplink transmission (e.g., a cyclic shift of 1, 4, 7, and 10 for the first, second, third, and fourth UE respectively).

In a second case, the base station may configure each UE in a set to apply a TD-OCC DMRS multiplexing scheme to achieve randomization. The base station may configure each UE to apply a unique TD-OCC to a base sequence for DMRS multiplexing (e.g., to achieve orthogonality between multiple UEs) and may configure each UE to apply either a different TD-OCC or a TD-cyclic shift to the base sequence to achieve randomization. The base station may indicate which TD-OCC each UE (e.g., by an index) is to apply for DMRS multiplexing. In a first example, the TD-OCC index may be fixed across DMRS symbols (e.g., different DMRS transmissions by a same UE within a same TTI), but the cyclic shift may be changed across DMRS symbols (e.g., for randomization). The base station may indicate to the UE (e.g., via an RRC parameter) a TD-OCC to apply to a base sequence and change a TD-cyclic shift from a first DMRS transmission to a second DMRS transmission. In a second example, the base station may use TD-OCC hopping across DMRS symbols to achieve DMRS randomization. The base station may indicate TD-OCC hopping across DMRS symbols to achieve both DMRS multiplexing and randomization. That is, the base station may configure each UE to use a first TD-OCC for a first DMRS symbol and a second TD-OCC for a second DMRS symbol.

In some examples, a base station may configure a set of UEs to use PUSCH or PUCCH bundling. The base station may indicate to UEs (e.g., that are at a cell edge) to use repetition of transmissions in order to accumulate the received power of the transmission at the base station. In this case, the UE may transmit a same PUSCH or PUCCH transmission more than one time. The base station may configure the UE to use TD-OCC hopping across different DMRS transmissions within a bundle. For example, a UE may transmit a PUSCH transmission twice, and the base station may configure the UE to use a first TD-OCC for the first DMRS transmission (e.g., within the first PUSCH transmission) and a second TD-OCC for the second DMRS transmission (e.g., within the second PUSCH transmission).

Aspects of the disclosure are initially described in the context of a wireless communications system. Example DMRS configurations, wireless communication systems for DMRS multiplexing scheme selection for uplink (UL) transmission, as well as block diagrams and process flows for implementing techniques discussed herein are then described. Aspects of the disclosure are further illustrated by and described with reference to apparatus diagrams, system diagrams, process flows, and flowcharts that relate to DMRS multiplexing scheme selection for uplink transmission.

FIG. 1 illustrates an example of a wireless communications system 100 that supports DMRS multiplexing scheme selection for uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may support DMRS schemes that utilize one or both intra-symbol TD-OCCs and TD-cyclic shifts in order to multiplex the DMRSs of multiple UEs 115 on the same resource. A base station 105 may configure an RRC parameter to indicate to each UE 115 in a set of UEs which DMRS scheme to use. For example, the base station 105 may transmit an RRC parameter indicating to apply a TD-OCC DMRS scheme or a TD-cyclic shift DMRS scheme. The base station 105 may also configure the UE 115 with a base DMRS sequence that the UE 115 uses to generate an orthogonal DMRS sequence. The base station 105 may also assign a different index to each UE, and each UE 115 may apply a specific TD-OCC or TD-cyclic shift to the base DMRS sequence corresponding to the assigned index to generate an orthogonal DMRS sequence. Each UE 115 may modulate its orthogonal DMRS sequence to generate a DMRS transmission (e.g., a π/2 binary phase shift keying modulated uplink transmission).

The UE 115 may transmit the DMRS according to the indicated scheme and assigned index, and the base station 105 may monitor for the DMRS according to the indicated scheme. For example, the base station 105 may indicate a DMRS scheme for four UEs 115. Each UE 115 may be configured with a unique index that corresponds to a different TD-OCC or TD-cyclic shift so that each of the four UEs 115 may transmit in the same resources (e.g., the different TD-OCCs or TD-cyclic shifts result in orthogonality). Because the DMRS sequences generated by the UEs 115 (according to the DMRS scheme and assigned index) are orthogonal to one another, the base station 105 may use the orthogonal DMRS sequences to differentiate simultaneous uplink transmissions from each of the four UEs 115 within the same uplink resources.

In some cases, the base station 105 may configure the RRC parameter separately for PUSCH DMRS transmissions and PUCCH DMRS transmissions. Further, there may be a default DMRS scheme utilized by each UE 115. In the absence of receiving an RRC parameter from the base station 105, a UE 115 may transmit the DMRS according to a default DMRS scheme. In some cases, the default DMRS scheme may be different for PUCCH DMRSs and PUSCH DMRSs.

Figure 2:
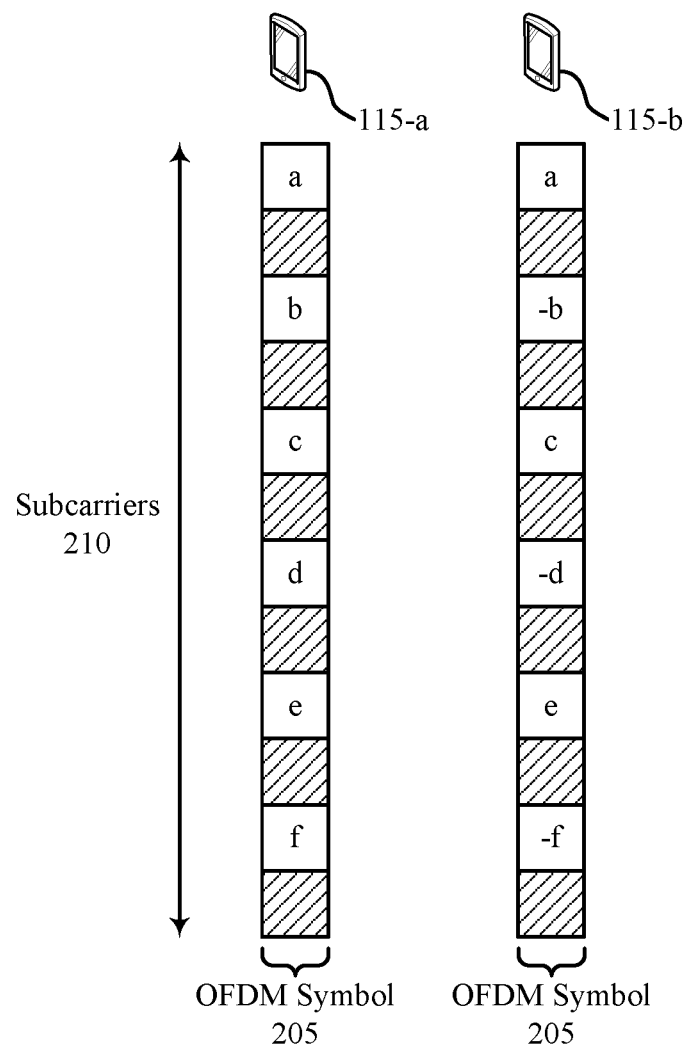
FIGS. 2, 3A & 3B illustrate examples of a demodulation reference signal (DMRS) scheme in accordance with aspects of the present disclosure.

FIG. 2 illustrates an example of a DMRS scheme 200 in accordance with aspects of the present disclosure. The DMRS scheme 200 may be used in wireless communications system 100. For example, UEs 115-a and 115-b may be examples of UEs 115 of FIG. 1 and may utilize the DMRS scheme 200 to communicate with a base station (e.g., such as a base station 105 as described with reference to FIG. 1). DMRS scheme 200 may illustrate a frequency domain OCC. In some cases, the frequency domain OCC may be equivalent to a TD-cyclic shift.

The DMRS scheme 200 may enable a base station to differentiate a DMRS transmitted by different UEs 115-a and 115-b within the same OFDM symbol period 205. In order to reduce interference between DMRSs being transmitted by UE 115-a and 115-b, each UE 115 may apply a frequency domain OCC to a base DMRS sequence. Thus, UE 115-a may generate a DMRS sequence from the base DMRS sequence that is orthogonal to the DMRS sequences generated by the other UE 115-b. The base station may use the orthogonal DMRS sequences to differentiate transmissions within the OFDM symbol period 205 from the respective UEs 115-a and 115-b. The base station 105 may indicate a frequency domain OCC to each UE 115-a and 115-b. That is, the base station may support both the DMRS scheme that utilize intra-symbol TD-OCCs and the DMRS scheme that utilize frequency domain OCC (e.g., TD-cyclic shifts) in order to multiplex the DMRSs of the multiple UEs 115 on the same OFDM symbol 205. The base station may indicate (e.g., by an RRC parameter) a frequency domain OCC scheme to each UE 115 to apply to a base DMRS sequence.

In an example, the base DMRS sequence may include a transmission of a, b, c, d, e, and f across a subset of the 12 subcarriers 210. UE 115-a and 115-b may apply a frequency domain OCC to the base DMRS sequence to generate orthogonal DMRS sequences. That is, UE 115-a may transmit a first sequence a, b, c, d, e, and f on each of the odd subcarriers 210 (e.g., subcarriers 1, 3, 5, 7, 9, and 11) and UE 115-b may transmit a second sequence a, −b, c, −d, e, and −f on the same odd subcarriers 210, where the first and second sequences may be orthogonal to each other. In some cases, the UEs 115 may transmit a null subcarrier on the even subcarriers (e.g., the subcarriers not being used to transmit the DMRS transmission). Because the first and second sequence are orthogonal, the base station may differentiate the DMRS transmission by UE 115-a from the DMRS transmission by UE 115-b.

In some cases, the base station may use a comb-2 structure in the frequency domain to support two multi-users. That is, the base station may support two UEs transmitting orthogonal DMRSs on a first comb (e.g., including the odd subcarriers 210) and two additional UEs 115 transmitting orthogonal DMRSs on a second comb (e.g., including the even subcarriers 210 such as subcarriers 2, 4, 6, 8, 10, and 12). The UEs transmitting DMRS transmissions on the same comb (e.g., on the same subset of subcarriers 210) may orthogonalize the DMRS transmissions by applying a frequency domain OCC to a same DMRS base sequence. Therefore, the DMRS scheme 200 may support a multiple user capacity of four UEs within one DMRS symbol (e.g., OFDM symbol 205). For example, an NR wireless communications system may support a multiple user capacity of four UEs within a DMRS symbol for PUSCH using a comb-2 structure and frequency domain OCC. In another example, a NR PUCCH format four may allow a base station to multiplex two or four UEs on a same resource block by time-domain cyclic shifts and TD-OCCs. In some cases, the NR PUCCH format four may not support frequency domain combs.

Figure 3A:
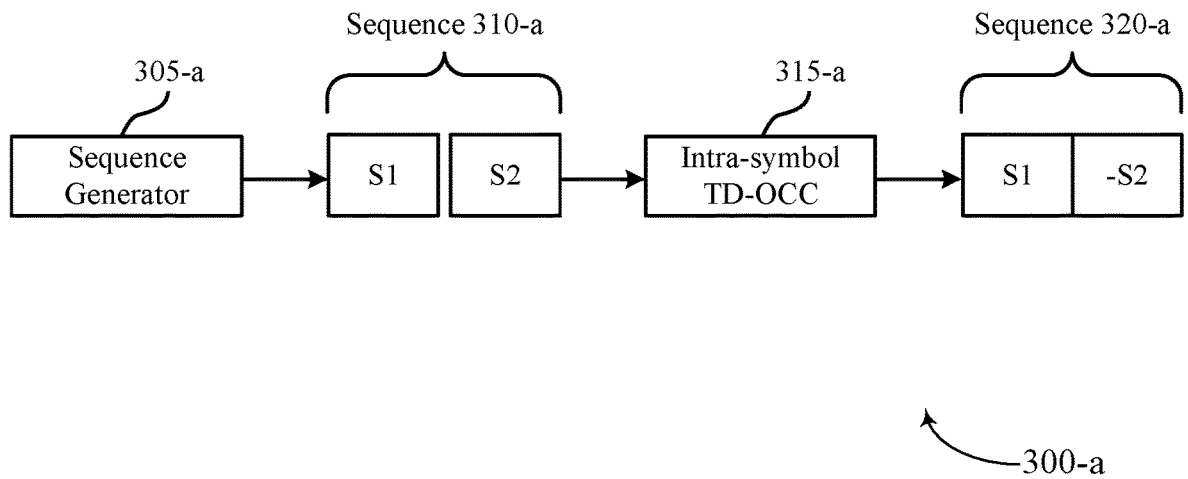

FIG. 3A illustrates an example of a DMRS scheme 300-a in accordance with aspects of the present disclosure. The DMRS scheme 300-a may be used in wireless communications system 100. For example, UEs 115 of FIG. 1 may utilize the DMRS scheme 300-a to communicate with a base station 105 of FIG. 1. DMRS scheme 300-a may illustrate an intra-symbol TD-OCC DMRS scheme 300-a.

Sequence generator 305-a may generate a base DMRS sequence. In some cases, a sequence generator 305-a may be at a UE (e.g., discussed with reference to FIG. 1). The sequence generator 305-a may generate a base DMRS sequence according to an indication (e.g., received from a base station). For example, a base station may indicate a type of base DMRS sequence to a UE, and the sequence generator 305-a may generate the base DMRS sequence accordingly. In some cases, the base station may indicate a gold sequence based $\pi/2$ binary phase-shift keying (BPSK) sequence (e.g., in the event that the length of the sequence is larger than or equal to 30). The sequence generator 305-a may be a gold sequence generator followed by a $\pi/2$ BPSK modulator.

The sequence generator 305-a may generate sequence 310-a. In the case that the sequence generator 305-a is a gold sequence generator followed by a $\pi/2$ BPSK modulator, sequence 310-a may be a gold sequence based $\pi/2$ BPSK sequence. The sequence 310-a may include a first half of the sequence S1 and a second half of the sequence S2, where S1 and S2 are half of the length of the sequence 310-a. For example, if the sequence 310-a has a length of 60, S1 and S2 each has a length of 30.

The UE may apply an intra-symbol TD-OCC 315-a on the sequence 310-a. In some cases, the UE may receive an indication from a base station indicating a TD-OCC DMRS scheme (e.g., indicating to apply the TD-OCC 315-a to the sequence 310-a). That is, the base station may support both the DMRS scheme that utilizes intra-symbol TD-OCCs and the DMRS scheme that utilizes TD-cyclic shifts in order to multiplex DMRSs of the multiple UEs on the uplink resource. The base station may indicate (e.g., by an RRC parameter) the TD-OCC DMRS scheme. That is, the base station may indicate to apply the intra-symbol TD-OCC 315-a. In some cases, the intra-symbol TD-OCC 315-a may be a different multiplexing mechanism compared to a TD-cyclic shift scheme applied by conventional NR wireless communications systems, and may have better performance when a gold sequence based $\pi/2$ BPSK sequence is used as a base DMRS sequence.

The intra-symbol TD-OCC 315-a may generate the sequence 320-a by applying an intra-symbol TD-OCC 315-a to the sequence 310-a. In some cases, a UE may transmit the sequence 320-a according to a $\pi/2$ binary phase shift keying modulation scheme. That is, in some examples, a $\pi/2$ binary phase shift keying modulated gold sequence may be used as the DMRS for uplink transmissions with $\pi/2$ binary phase shift keying modulation when the sequence length is at least a defined number of bits (e.g., 30 or larger). The sequence 320-a may be orthogonal to a DMRS sequence generated (and transmitted) by a second UE on the same uplink resource. The second UE may generate a gold sequence based BPSK sequence 310-a including S1 and S2 (e.g., based on receiving an indication of a gold base DMRS sequence from the base station or otherwise determining the gold base DMRS sequence). The base station may indicate to the second UE to apply an intra-symbol TD-OCC that results in the same sequence as the sequence 310-*a*. The sequences 310-*a* and 320-*a* may be orthogonal to each other. When the first UE transmits the sequence 320-*a* and the second UE transmits the sequence 310-*a* in a same uplink resource, the base station may use the orthogonal sequences 310-*a*, 320-*a* to differentiate the DMRS transmissions within the same uplink resources from the respective UEs. In some cases, the base station may implement a new receiver (e.g., when compared to a receiver necessary for conventional DMRS de-multiplexing) to de-multiplex DMRSs received from different UE within a same uplink resource. In some instances, the new receiver may increase the complexity of the base station.

Figure 3B:
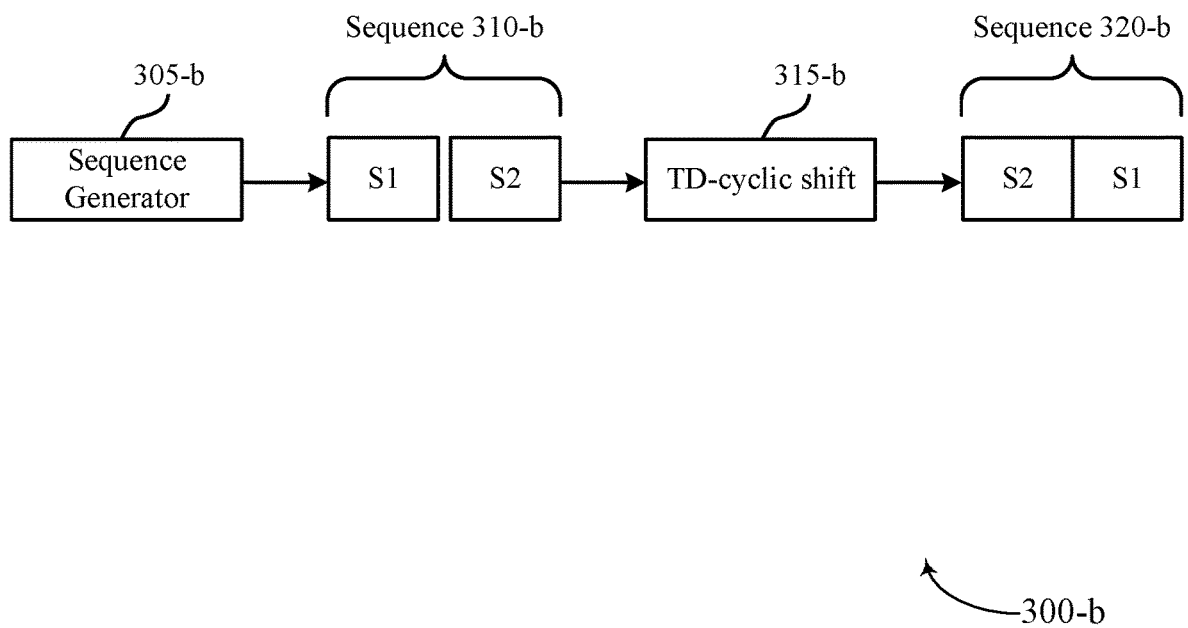

FIG. 3B illustrates an example of a DMRS scheme 300-*b* in accordance with aspects of the present disclosure. The DMRS scheme 300-*b* may be used in wireless communications system 100. For example, UEs 115 may utilize the DMRS scheme 300-*b* to communicate with a base station 105. DMRS scheme 300-*b* may illustrate a TD-cyclic shift DMRS scheme 300-*b*.

Sequence generator 305-*b* may generate a base DMRS sequence. In some cases, a sequence generator 305-*b* may be at a UE (e.g., discussed with reference to FIG. 1). The sequence generator 305-*b* may generate a base DMRS sequence according to an indication (e.g., received from a base station). For example, a base station may indicate a type of base DMRS sequence to a UE, and the sequence generator 305-*b* may generate the base DMRS sequence accordingly. In some cases, the base station may indicate a gold sequence based $\pi/2$ BPSK sequence (e.g., in the event that the sequence is larger than 30). The sequence generator 305-*b* may be a gold sequence generator followed by a $\pi/2$ BPSK modulator.

The sequence generator 305-*b* may generate sequence 310-*b*. In the case that the sequence generator 305-*b* is a gold sequence generator followed by a $\pi/2$ BPSK modulator, sequence 310-*b* may be a gold sequence based $\pi/2$ BPSK sequence. Alternatively or additionally, the sequence 310-*b* may be a different type of base DMRS sequence. The sequence 310-*b* may include a first half of the sequence S1 and a second half of the sequence S2, where S1 and S2 are half of the length of the sequence 310-*b*. For example, if the sequence 310-*b* has a length of 60, S1 and S2 each of a length of 30.

The UE may apply a TD-cyclic shift 315-*b* on the sequence 310-*b* to generate a second sequence 320-*b*. In some cases, the UE may receive an indication from a base station indicating to apply the TD-cyclic shift 315-*b* to the sequence 310-*b*. That is, the base station may support both the DMRS scheme that utilizes intra-symbol TD-OCCs and the DMRS scheme that utilizes TD-cyclic shifts in order to multiplex DMRSs of the multiple UEs on the uplink resource. The base station may indicate (e.g., by an RRC parameter) the TD-cyclic shift 315-*b*.

The TD-cyclic shift 315-*b* may generate the sequence 320-*b* by applying a TD-cyclic shift to the sequence 310-*b*. The resulting sequence 320-*b* includes S2 before S1. In the case where the sequence 310-*b* is a gold DMRS base sequence, sequence 320-*b* may not be orthogonal to sequence 310-*b*. Therefore, if a first UE transmits sequence 320-*b* during a same uplink resource as a second UE transmits sequence 310-*b*, the base station may not be able to differentiate the DMRS transmissions between the first and second UEs. However, if sequence 310-*b* is a different type of base DMRS sequence instead of a gold DMRS base sequence (e.g., a base DMRS sequence indicated by a certain type of NR scheme), sequence 320-*b* may be orthogonal to sequence 310-*a*. That is, the TD-cyclic shift 315-*b* may generate a sequence 320-*b* that is orthogonal to sequence 310-*b* if the base sequence is a certain type. If sequence 310-*b* is orthogonal to sequence 310-*a*, when a first UE transmits sequence 320-*b* during a same uplink resource as a second UE transmits sequence 310-*b*, the base station may be able to use orthogonal sequences to differentiate the DMRS transmissions between the first and second UEs.

In some examples, the DMRS schemes 300-*a* and 300-*b* may support a multiple user capacity of two or four UEs within one DMRS symbol. For example, an NR wireless communications system may support a multiple user capacity of four UEs within a DMRS symbol for PUSCH using a comb-2 structure and frequency domain OCC. In another example, an NR PUCCH format four may allow a base station to multiplex two or four UEs on a same resource block by time-domain cyclic shifts. In some cases, the NR PUCCH format four may not support frequency domain combs. In other cases, an NR PUCCH format four may allow a UE to apply a TD-OCC (with a size of two or four) to multiplex DMRSs from different UEs.

Figure 4:
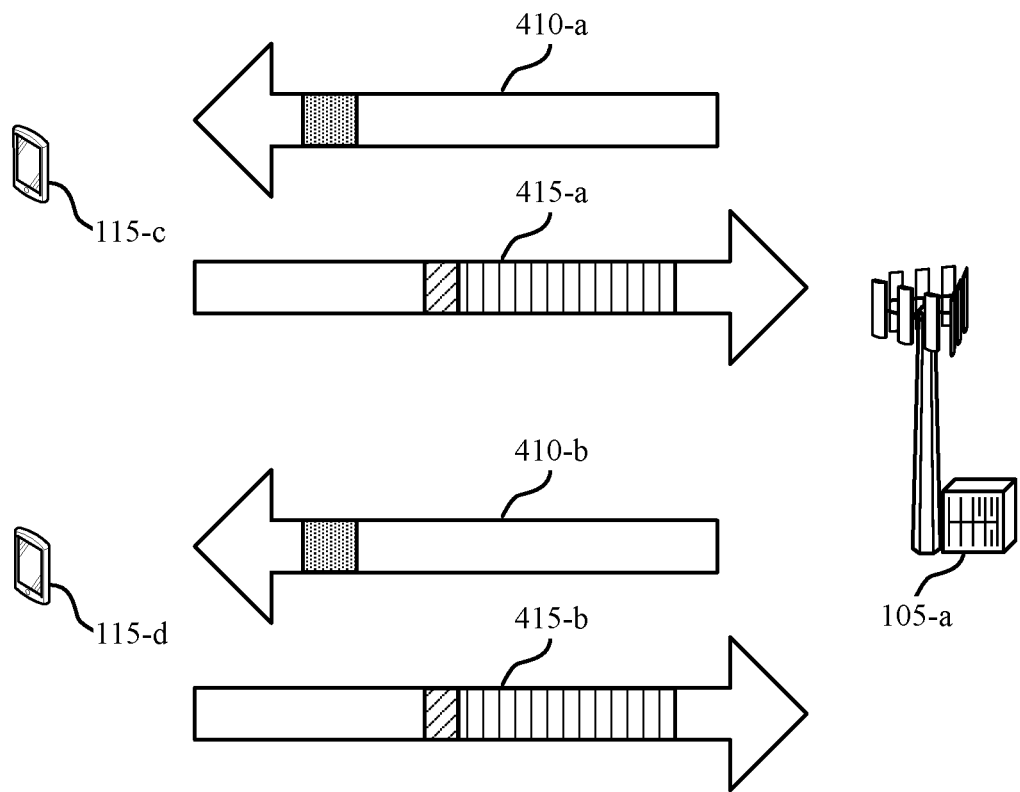
FIGS. 4 through 6 illustrate example of a wireless communication systems in accordance with aspects of the present disclosure.
Figure 4:
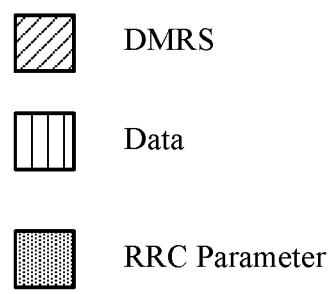

FIG. 4 illustrates an example of a wireless communication system 400 in accordance with aspects of the present disclosure. In some examples, wireless communication system 400 may implement aspects of wireless communication system 100. Further, wireless communication system 400 may implement aspects of DMRS schemes 200 and 300. In the example of FIG. 4, the wireless communication system 400 may include base station 105-*a* which may be an example of a base station 105 of FIG. 1. The wireless communication system 400 may also include UEs 115-*c* and UE 115-*d*, which may be examples of UEs 115 of FIG. 1.

Base station 105-*a* may support DMRS schemes that utilize one or both intra-symbol TD-OCCs and TD-cyclic shifts in order to multiplex the DMRSs of multiple UEs on the same resource. For example, the base station 105-*a* may support an intra-symbol TD-OCC DMRS multiplexing scheme, a TD-cyclic shift DMRS multiplexing scheme, or both, for DMRS transmissions of multiple UEs 115 on the same uplink transmission 415 resources. Base station 105-*a* may indicate by a downlink transmission 410 which DMRS scheme of the multiple DMRS schemes each of the multiple UEs is to apply. For example, base station 105-*a* may transmit an indication of the DMRS scheme by an RRC parameter. UE 115-*c* and UE 115-*d* may both generate and transmit DMRSs according to the same indicated scheme. Base station 105-*a* may transmit an indication of a base DMRS sequence to each UE of a set of UEs (e.g., as well as an indication of the DMRS scheme). In some cases, the base station 105-*a* may indicate an intra-symbol TD-OCC DMRS scheme when using a gold base DMRS sequence. Additionally or alternatively, the base station 105-*a* may indicate a TD-cyclic shift DMRS scheme when using a different type of base DMRS sequence. In some cases, the base station 105-*a* may configure DMRS schemes (e.g., by an RRC parameter) separately for PUSCH DMRS transmissions and PUCCH DMRS transmissions.

In order to achieve orthogonality between DMRS transmissions by UE 115-*c* and UE 115-*d*, the base station 105-*a* may indicate a different intra-symbol TD-OCC or TD-cyclic shift (e.g., by an RRC or a downlink control information (DCI) parameter in downlink transmission 410-*a*) to UE 115-*c* than to UE 115-*d* (e.g., by an RRC or a DCI parameter in downlink transmission 410-*b*). For example, base station 105-*a* may assign a unique DMRS index to each of UEs 115-*c* and 115-*d* using an RRC or DCI that correspond to a different TD-OCC or a different TD-cyclic shift. In an example, the base station 105-*a* may assign a first unique TD-OCC DMRS index to UE 115-*c* for generating a first DMRS sequence according to a TD-OCC DMRS scheme, and may assign a second unique TD-OCC DMRS index to UE 115-*c* for generating a second DMRS sequence according to the TD-OCC DMRS scheme. The unique DMRS index may indicate a specific intra-symbol TD-OCC (e.g., within the context of the indicated DMRS scheme) to apply to the base sequence. The base station 105-*a* may similarly assign unique indexes to UEs 115-*c* and 115-*d* when the TD-cyclic shift scheme is indicated. Each UE 115-*c* and 115-*d* thus generates a DMRS sequence that is orthogonal to DMRS sequences generated by other UEs 115 in the set based on the indicated DMRS scheme and assigned index.

For example, if base station 105-*a* indicates a TD-OCC DMRS scheme (e.g., by an RRC parameter) to UEs 115-*c* and 115-*d*, UE 115-*c* may apply a first intra-symbol TD-OCC to the base DMRS sequence according to a first unique DMRS index assigned by base station 105-*a*. UE 115-*d* may apply a second intra-symbol TD-OCC to the base DMRS sequence according to its unique DMRS index assigned by base station 105-*a*.

In another example, UE 115-*c* may receive an RRC parameter from the base station 105-*a* by downlink 410-*a* and select a DMRS scheme based on the RRC parameter. Further, UE 115-*c* may receive an indication of a unique DMRS index corresponding to the indicated DMRS scheme from base station 105-*a* (e.g., by an RRC parameter or by DCI). UE 115-*c* may utilize a look-up table (LUT) to determine a specific TD-OCC or TD-cyclic shift to apply to the base DMRS sequence based on the unique DMRS index and the selected DMRS scheme.

Additionally or alternatively, the base station 105-*a* may not indicate a DMRS scheme to UE 115-*c*. If the UE 115-*c* does not receive an indication of the type of DMRS scheme, then the UE 115-*c* may use the default DMRS scheme. In some cases, the default scheme may be based on a type of base DMRS sequence. For example, if the UE 115-*c* is configured with a particular base DMRS sequence (e.g., a gold DMRS base sequence) and the UE 115-*c* does not receive an indication of a DMRS scheme (e.g., the base station 105-*a* does not configure and/or transmit an RRC parameter), then UE 115-*c* may use an intra-symbol TD-OCC DMRS scheme. In some cases, the default DMRS scheme may be different for PUCCH DMRSs and PUSCH DMRSs.

In another example, UE 115-*d* may receive an RRC parameter from the base station 105-*a* by downlink 410-*b* and select a DMRS scheme based on the RRC parameter. Further, UE 115-*d* may receive an indication of a unique DMRS index corresponding to the DMRS scheme from the base station 105-*a* (e.g., by an RRC parameter or by DCI). UE 115-*d* may utilize a look-up table (LUT) to determine a specific TD-OCC or TD-cyclic shift to apply to the base DMRS sequence based on the unique DMRS index and the selected DMRS scheme. The specific TD-OCC or TD-cyclic shift may be different than a TD-OCC or TD-cyclic shift that UE 115-*c* applies to the base DMRS sequence. Additionally or alternatively, the base station 105-*a* may not indicate a DMRS scheme to UE 115-*d*. If the UE 115-*d* does not receive an indication of the type of DMRS scheme, then the UE 115-*d* may use the default scheme. In some cases, the default scheme may be based on a type of base DMRS sequence. For example, if the UE 115-*d* does not receive an indication of a DMRS scheme (e.g., the base station 105-*a* does not configure and/or transmit an RRC parameter), then UE 115-*d* may use an intra-symbol TD-OCC DMRS scheme. In some cases, the default DMRS scheme may be different for PUCCH DMRSs and PUSCH DMRSs.

The UEs 115-*c* and 115-*d* may each apply a specific TD-OCC or TD-cyclic shift (e.g., a TD-OCC or TD-cyclic shift that is different than a TD-OCC or TD-cyclic shift being used by the other UE 115) to the base DMRS sequence to generate orthogonal DMRS sequences based on their respectively assigned indexes. Each UE 115-*c* and 115-*d* may modulate the orthogonal DMRS sequence to generate a DMRS transmission (e.g., a $\pi/2$ binary phase shift keying modulated uplink transmission). Thus, UE 115-*c* may transmit the DMRS by uplink transmissions 415-*a* according to the indicated scheme and UE 115-*d* may transmit the DMRS by uplink transmission 415-*b*. The uplink transmissions 415 may include the DMRS transmissions and data transmissions such that the DMRS transmissions enable the base station 105-*a* to decode the data transmissions from the respective UEs 115-*c* and 115-*d* within the same uplink resource. The respective DMRS transmissions (e.g., the DMRS transmission within uplink transmission 415-*a* and the DMRS transmission within uplink transmission 415-*b*) may be orthogonal. Further, the UEs 115-*c* and 115-*d* may transmit the DMRS transmissions by a same uplink resource (e.g., a same OFDM symbol).

The base station 105-*a* may monitor the uplink transmissions 415 for the DMRS transmissions according to the DMRS scheme indicated by the RRC parameters (e.g., within downlink transmissions 410). Further, the base station 105-*a* may use the orthogonal DMRS sequences to differentiate transmissions within the same uplink resources from the respective UEs 115. The base station 105-*a* may demodulate the uplink transmissions 415 based on a $\pi/2$ binary phase shift keying modulation scheme and the DMRS.

Figure 5:
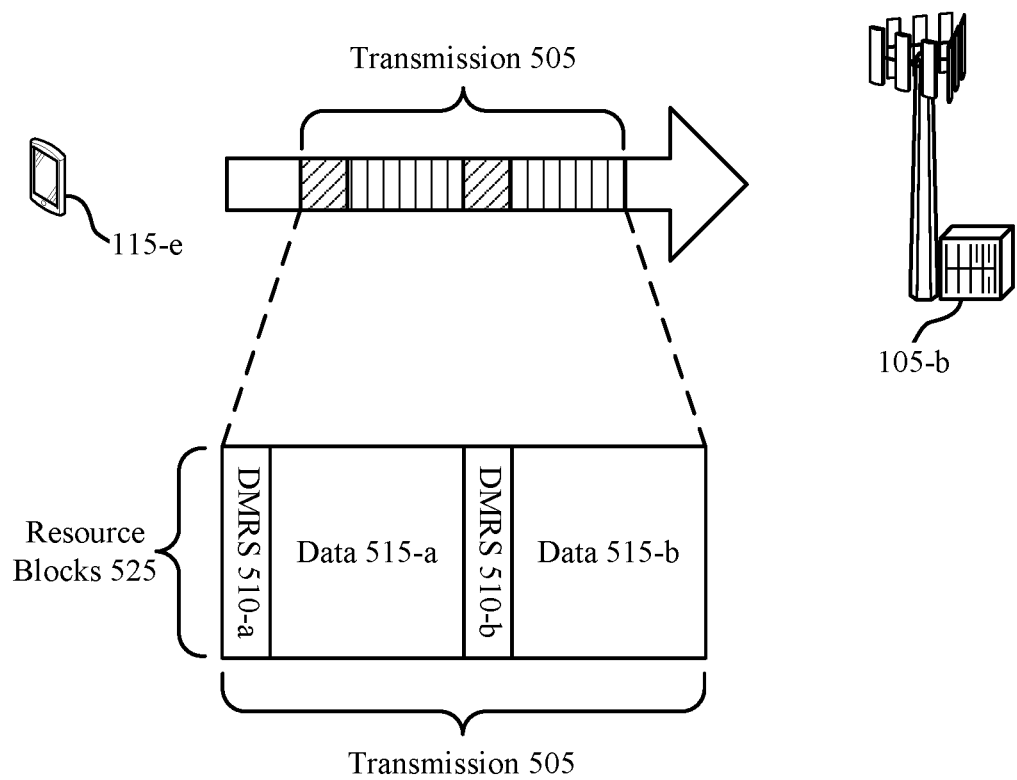

FIG. 5 illustrates an example of a wireless communication system 500 in accordance with aspects of the present disclosure. In some examples, wireless communication system 400 may implement aspects of wireless communication systems 100 and 400. In the example of FIG. 5, the wireless communication system 500 may include base station 105-*b* which may be an example of a base station 105 of FIG. 1 or FIG. 4. The wireless communication system 500 may also include UE 115-*e*, which may be an example of a UE 115 of FIG. 1 or FIG. 4. In some cases, wireless communication system 400 may implement aspects of DMRS schemes 200 and 300. For example, UE 115-*a* may utilize aspects of DMRS schemes 200 and 300 for DMRS transmissions to base station 105-*b*.

UE 115-*e* may transmit more than one DMRS symbol 510 to the base station 105-*b* within a single uplink transmission 505. For example, UE 115-*e* may transmit two DMRS symbols 510 within a single transmission 505. In an example, transmission 505 may include two portions of a PUSCH transmission. UE 115-*e* may transmit DMRS symbol 510-*a* and data 515-*a* within a first portion of the PUSCH transmission and DMRS symbol 510-*b* and data 515-*b* within a second portion of the PUSCH transmission. In another example, transmission 505 may include two portions of a PUCCH transmission. UE 115-*e* may transmit DMRS symbol 510-*a* and data 515-*a* within a first portion of the PUCCH transmission and DMRS symbol 510-*b* and data 515-*b* within a second portion of the PUCCH transmission. The transmissions may span one or more resource blocks 525. In one example, the transmission 505 may span a single resource block (e.g., 12 subcarriers). When the UE 115-*e* transmits more than one DMRS symbol 510 within a single uplink transmission 505, the base station 105-*b* may use DMRS randomization.

In a first case, the base station 105-*b* may configure UE 115-*e* for DMRS cyclic shift hopping across the DMRS symbols to achieve DMRS sequence randomization. Base station 105-*b* may configure one or more UEs (e.g., including UE 115-*e*) to utilize a DMRS scheme with DMRS cyclic shift hopping to achieve DMRS sequence randomization by indicating the DMRS scheme to the set of UEs via an RRC parameter. For example, in NR systems, for PUCCH formats three and four, the base station 105-*b* may enable DMRS cyclic shift hopping (e.g., by TD-cyclic shifts) to achieve DMRS sequence randomization. That is, the base station 105-*b* may configure UE 115-*e* to transmit DMRS symbols 510 by applying a first TD-cyclic shift to a base DMRS sequence for DMRS symbol 510-*a* and a second TD-cyclic shift to the base sequence for DMRS symbol 510-*b*. The base station 105-*b* may configure the UE 115-*e* to apply TD-cyclic shifts to a base DMRS sequence to achieve orthogonalization between DMRSs received from different UEs and to achieve randomization between DMRS symbols 510-*a* and 510-*b*. TD-cyclic shifts may be used for both DMRS randomization as well as for multi-user multiplexing. The base station 105-*b* may indicate (e.g., by a DMRS index sent via an RRC parameter) the DMRS hopping scheme.

Table 1, shown below, shows an example of TD-cyclic shifts applied to base DMRS sequences to achieve DMRS sequence randomization. In an example, base station 105-*b* may indicate (e.g., via RRC signaling) that a set of four UEs is to apply a TD-cyclic shift DMRS multiplexing scheme. Four UEs (e.g., including UE 115-*e*) are multiplexed for transmitting DMRS symbols 510 on the same one or more resource blocks 525. The base station 105-*b* may respectively transmit an RRC parameter or a DCI parameter to indicate a unique DMRS index to each of the four UEs (e.g., DMRS index 0, 1, 2, and 3). Based on the received DMRS index, each UE may apply different cyclic shifts on each of the first and second DMRS symbols 510 corresponding to Table 1. In an example, the cyclic shifts for a first DMRS symbol may be 0, 3, 6, and 9 respectively corresponding to DMRS indexes 0, 1, 2, and 3. Further, each UE may apply different cyclic shifts on different DMRS symbols (e.g., for DMRS symbols 510-*a* and 510-*b*) in accordance with their respectively assigned DMRS indexes. In some examples, there may be a total of 12 cyclic shifts defined.

TABLE 1

TD-Cyclic Shift Applied to Base DMRS Sequence

| DMRS Index | Cyclic Shift on DMRS Symbol 1 | Cyclic Shift on DMRS Symbol 2 |
| --- | --- | --- |
| 0 | 0 | 1 |
| 1 | 3 | 4 |
| 2 | 6 | 7 |
| 3 | 9 | 10 |

According to Table 1, if the base station 105-*b* indicates to the UE 115-*e* (e.g., by an RRC parameter or a DCI parameter) a DMRS index of 2, UE 115-*e* may transmit DMRS symbol 510-*a* by applying a cyclic shift of 6 and DMRS symbol 510-*b* by applying a cyclic shift of 7. In another example, there may be a second UE transmitting two DMRSs to the base station 105-*b* by the same uplink resources as UE 115-*e* is using to transmit DMRS symbol 510-*a* and DMRS symbol 510-*b*. If the base station 105-*b* indicates to a second UE a DMRS index of 3, the second UE may transmit a DMRS by applying a cyclic shift of 9 and 10 to its first and second DMRS transmissions respectively. Thus, the DMRS transmissions of UE 115-*e* and the second UE may be orthogonal on each of the DMRS symbols.

In another case when the TD-OCC DMRS multiplexing scheme is being used, the base station 105-*b* may configure additional DMRS randomization techniques to achieve DMRS randomization across different DMRS symbols. For example, TD-OCC hopping or TD-cyclic shift hopping may be used for DMRS randomization. In an example, base station 105-*b* may configure a set of UEs (e.g., including UE 115-*e*) to utilize TD-OCC DMRS multiplexing via an RRC parameter. The base station 105-*b* may assign a first DMRS index within the indicated DMRS scheme to configure the UE 115-*e* to apply a unique TD-OCC to a base sequence for DMRS multiplexing (e.g., to achieve orthogonality between multiple UEs). Similarly, the base station 105-*b* may assign a second DMRS index within the indicated DMRS scheme to configure a second UE to apply a different TD-OCC to the base sequence. The base station 105-*b* may configure UE 115-*e* to apply TD-OCC to achieve randomization for PUCCH DMRSs and PUSCH DMRSs.

In a first example of using a TD-OCC multiplexing DMRS scheme, the base station 105-*b* may configure UE 115-*e* to use TD-OCC hopping for randomization across DMRS symbols (e.g., different DMRS symbols 510 by UE 115-*e* within transmission 505). The base station 105-*b* may transmit an indication of the TD-OCC multiplexing DMRS scheme to UE 115-*e* (and any other UEs within the same set as UE 115-*e*) by an RRC parameter. The base station 105-*b* may indicate to the UE 115-*e* (e.g., via an RRC parameter or a DCI parameter) a TD-OCC to apply to a base sequence and change a TD-OCC from DMRS symbol 510-*a* to DMRS symbol 510-*b* to achieve randomization via TD-OCC hopping. The base station 105-*b* may configure the UE 115-*e* to apply TD-OCCs to a base DMRS sequence to achieve orthogonalization between DMRSs received from different UEs and to achieve randomization between DMRS symbols 510-*a* and 510-*b*. TD-OCCs may be used for both DMRS randomization as well as for multi-user multiplexing.

Table 2, shown below, shows an example of TD-OCC indexes that may be applied to base DMRS sequences to achieve DMRS sequence randomization. In an example, base station 105-*b* may indicate (e.g., via RRC signaling) that a set of four UEs is to apply a TD-OCC DMRS multiplexing scheme. Four UEs (e.g., including UE 115-*e*) are multiplexed for transmitting DMRS symbols 510 on the same one or more resource blocks 525. The base station 105-*b* may assign a unique DMRS index to each of the four UEs (e.g., 0, 1, 2, and 3) using an RRC parameter or a DCI parameter. Based on the assigned DMRS index, each UE may apply unique TD-OCCs to the DMRS symbol 510-*a* and DMRS symbol 510-*b*.

TABLE 2

TD-OCC Indexes Applied to Base DMRS Sequence

| DMRS Index | TD-OCC Index on DMRS Symbol 1 | TD-OCC Index on DMRS Symbol 2 |
| --- | --- | --- |
| 0 | 0 | 2 |
| 1 | 1 | 3 |
| 2 | 2 | 1 |
| 3 | 3 | 0 |

The TD-OCC index may be defined according to the following equation:

TD-OCC Index=(DMRS index+$\Delta_{offset}$)mod 4     (1)

In the above equation, $\Delta_{offset}$ may depend on the DMRS symbol index (e.g., the location of DMRS symbol 510-*a* and 510-*b* within the transmission 505) and may be the same for all UEs multiplexed on the one or more resource blocks 525. According to Table 2, if the base station 105-*b* assigns to the UE 115-*e* (e.g., by an RRC parameter or a DCI parameter) a DMRS index of 2, UE 115-*e* may transmit DMRS symbol 510-*a* by applying the TD-OCC indicated by the TD-OCC index 2 and DMRS symbol 510-*b* by applying the TD-OCC indicated by the TD-OCC index 1. In another example, there may be a second UE transmitting two DMRSs to the base station 105-*b* by the same uplink resources as UE 115-*e* is using to transmit DMRS symbol 510-*a* and DMRS symbol 510-*b*. If the base station 105-*b* assigns to a second UE a DMRS index of 3, the second UE may transmit a DMRS by applying the TD-OCC indicated by the TD-OCC index 3 and the TD-OCC index 0 to its first and second DMRS transmissions respectively. Thus, the DMRS transmissions of UE 115-*e* and the second UE may be orthogonal.

In a second example of using a TD-OCC multiplexing DMRS scheme, the base station 105-*b* may configure UE 115-*e* to use a same TD-OCC for different DMRS symbol periods of an uplink transmission and different TD-cyclic shifts (e.g., cyclic shift hopping) for randomization across DMRS symbols (e.g., different DMRS symbols 510 by UE 115-*e* within transmission 505). That is, the base station 105-*b* may configure UE 115-*e* with a same TD-OCC index (and corresponding TD-OCC) that is fixed across multiple DMRS symbols (e.g., same TD-OCC is applied to DMRS symbol 510-*a* to DMRS symbol 510-*b*), but the cyclic shift of the DMRS sequence is changed across DMRS symbols (e.g., a different cyclic shift is applied to DMRS symbol 510-*a* than to DMRS symbol 510-*b*). Thus, TD-OCC DMRS multiplexing scheme may be used for multi-user multiplexing, and TD-cyclic shift hopping may be used for DMRS randomization.

Table 3, shown below, shows an example of TD-OCC indexes and TD-cyclic shift indexes applied to base DMRS sequences to achieve multi-user multiplexing and DMRS sequence randomization. In an example, base station 105-*b* may indicate (e.g., via RRC signaling) that a set of four UEs is to apply a TD-OCC DMRS multiplexing scheme. Four UEs (e.g., including UE 115-*e*) are multiplexed for transmitting DMRS symbols 510 on the same resource blocks 525 using different TD-OCCs. The base station 105-*b* may respectively transmit an RRC parameter or DCI parameter that indicate a unique DMRS index assigned to each of the four UEs (e.g., 0, 1, 2, and 3). Based on the received DMRS index, each UE may determine a TD-OCC index corresponding to a unique TD-OCC to apply to both DMRS symbol 510-*a* and DMRS symbol 510-*b* as well as different cyclic shift indexes to apply to DMRS symbol 510-*a* and DMRS symbol 510-*b*.

TABLE 3

| | TD-OCC and Cyclic Shift Indexes Applied to Base DMRS Sequence | |
|---|---|---|
| DMRS Index | TD-OCC and Cyclic Shift Indexes on DMRS Symbol 1 | TD-OCC and Cyclic Shift Indexes on DMRS Symbol 2 |
| 0 | (0, 0) | (0, 1) |
| 1 | (1, 0) | (1, 1) |
| 2 | (2, 0) | (2, 1) |
| 3 | (3, 0) | (3, 1) |

According to Table 3, if the base station 105-*b* indicates to the UE 115-*e* (e.g., by an RRC parameter or a DCI parameter) a DMRS index of 2, UE 115-*e* may transmit DMRS symbol 510-*a* by applying the TD-OCC indicated by the TD-OCC index 2 and by applying a TD-cyclic shift indicated by the cyclic shift index 0. Further, UE 115-*e* may transmit DMRS symbol 510-*b* by applying the TD-OCC indicated by the TD-OCC index 2 and by applying a different TD-cyclic shift by applying the TD-cyclic shift indicated by the cyclic shift index 1. In another example, there may be a second UE transmitting two DMRSs to the base station 105-*b* by the same uplink resources as UE 115-*e* is using to transmit DMRS symbol 510-*a* and DMRS symbol 510-*b*. If the base station 105-*b* indicates to a second UE a DMRS index of 3, the second UE may transmit its first DMRS by applying the TD-OCC indicated by the index 3 and by applying the TD-cyclic shift indicated by the cyclic shift index 0 to the base DMRS sequence. Further, the second UE may transmit its second DMRS by applying the TD-OCC indicated by the index 3 and by applying the TD-cyclic shift indicated by the cyclic shift index 1 to the base DMRS sequence. Thus, the DMRS transmissions of UE 115-*e* and the second UE may be orthogonal.

Figure 6:
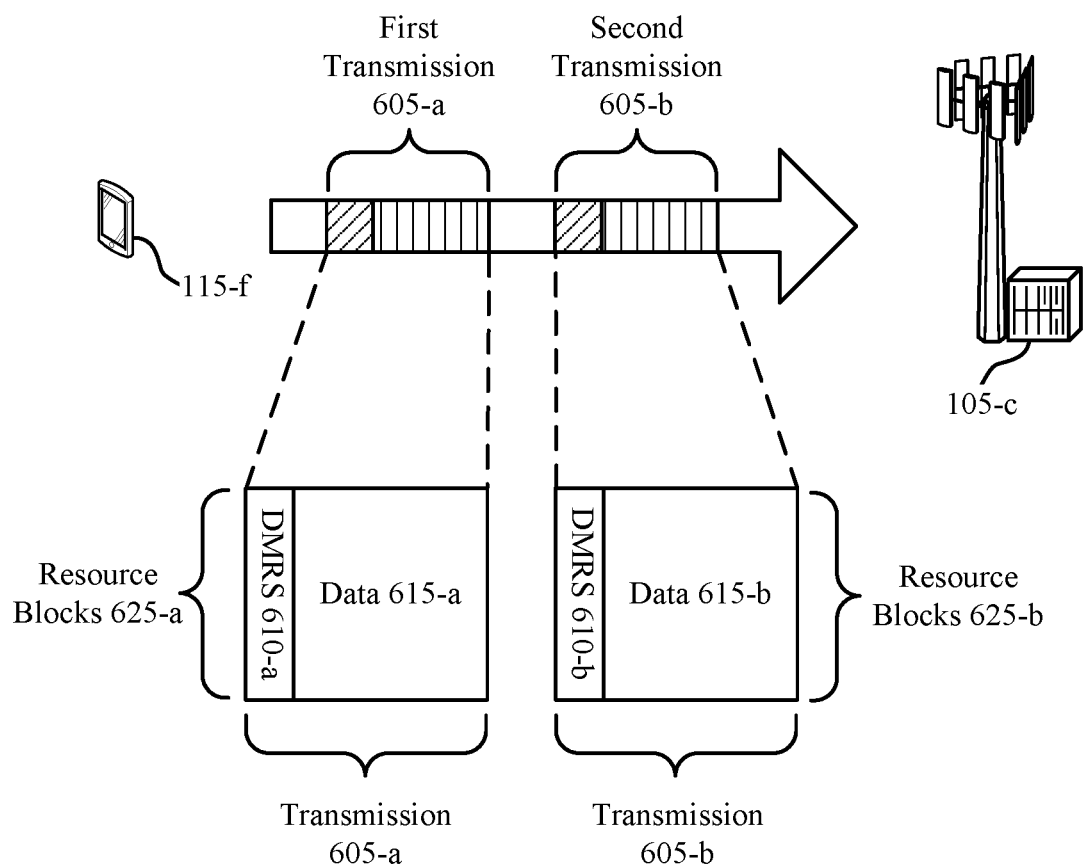

FIG. 6 illustrates an example of a wireless communication system 600 in accordance with aspects of the present disclosure. In some examples, wireless communication system 600 may implement aspects of wireless communication systems 100, 400, or 500. In the example of FIG. 6, the wireless communication system 600 may include base station 105-*c* which may be an example of a base station 105 of FIG. 1, FIG. 4, or FIG. 5. The wireless communication system 600 may also include UE 115-*f*, which may be an example of a UEs 115 of FIG. 1, FIG. 4, or FIG. 5. In some cases, the wireless communication system 600 may implement aspects of DMRS schemes 200 and 300. For example, UE 115-*f* may utilize aspects of DMRS schemes 200 and 300 in uplink communications to the base station 105-*c*.

The base station 105-*c* may configure UE 115-*f* to use PUSCH or PUCCH bundling. Bundling (e.g., repetition) may be used to permit base station 105-*c* to accumulate the received power of multiple uplink transmissions 605. For example, UE 115-*f* may be at the cell edge, and therefore PUSCH or PUCCH bundling may be used. UE 115-*f* may transmit the first PUSCH or PUCCH transmission 605-*a* and a second PUSCH or PUCCH transmission 605-*b* to base station 105-*c*. The second transmission 605-*b* may be a repetition of the first transmission 605-*a* (e.g., for bundling). UE 115-*f* may transmit DMRS 610 and data 615 within the transmission 605. The transmission 605 may span one or more resource blocks 625. In one example, the transmission 605 may span a single resource block 625 (e.g., 12 subcarriers). When the base station 105-*c* configures UE 115-*f* to use PUSCH or PUCCH bundling, the UE 115-*f* may use a hopping pattern (e.g., different TD-OCCs) across different bundles (e.g., copies) of the PUSCH/PUCCH transmission. That is, the UE 115-*f* may use the TD-OCC DMRS multiplexing scheme with a first TD-OCC for the first transmission 605-*a* and use a second TD-OCC for the second transmission 605-*b*.

Table 4, shown below, shows an example hopping patterns for PUSCH transmission. Here, the UE 115-*e* may apply different TD-OCC to different DMRSs 610 within a bundle. In an example, base station 105-*c* may indicate (e.g., via RRC signaling) that a set of four UEs is to apply a TD-OCC DMRS multiplexing scheme. Four UEs (e.g., including UE 115-*e*) are multiplexed for transmitting DMRSs 610 on the same resource blocks 625 for PUSCH bundling. The base station 105-*c* may respectively transmit an RRC or DCI parameter to assign a unique DMRS index to each of the four UEs (e.g., 0, 1, 2, and 3). Based on the received DMRS index, each UE may apply different TD-OCCs to the DMRS 610-*a* and DMRS 610-*b*. Based on the received DMRS index, each UE may determine different TD-OCC indexes corresponding to unique TD-OCCs to apply in the DMRS 610-*a* and DMRS 610-*b*.

TABLE 4

Hopping Patterns for PUSCH Bundling

| DMRS Index | TD-OCC index on 1st PUSCH Transmission | TD-OCC index on 2nd PUSCH Transmission |
|---|---|---|
| 0 | 0 | 2 |
| 1 | 1 | 3 |
| 2 | 2 | 1 |
| 3 | 3 | 0 |

According to Table 4, if the base station 105-*c* indicates to the UE 115-*f* (e.g., by an RRC parameter) a DMRS index of 2, UE 115-*f* may determine a hopping pattern including transmitting DMRS 610-*a* by applying a TD-OCC indicated by index 2 and transmitting DMRS 610-*b* by applying a TD-OCC indicated by index 1. In another example, there may be a second UE bundling PUSCH transmissions to the base station 105-*b* by the same uplink resources as UE 115-*f* is using to transmit DMRS 610-*a* and DMRS 610-*b*. If the base station 105-*c* indicates to a second UE a DMRS index of 3, the second UE may transmit its first and second DMRSs according to a hopping pattern including applying the TD-OCC indicated by the TD-OCC index 3 and the TD-OCC index 0 respectively. Thus, the DMRS in the respective PUSCH transmissions of UE 115-*f* and the second UE may be orthogonal. Each of the hopping patterns may indicate respective indexes corresponding to a set of transmissions. For example, each of the TD-OCC hopping patterns may indicate the respective TD-OCC indexes corresponding to a set of transmissions. Table 4 may be used similarly for PUCCH transmissions.

Figure 7:
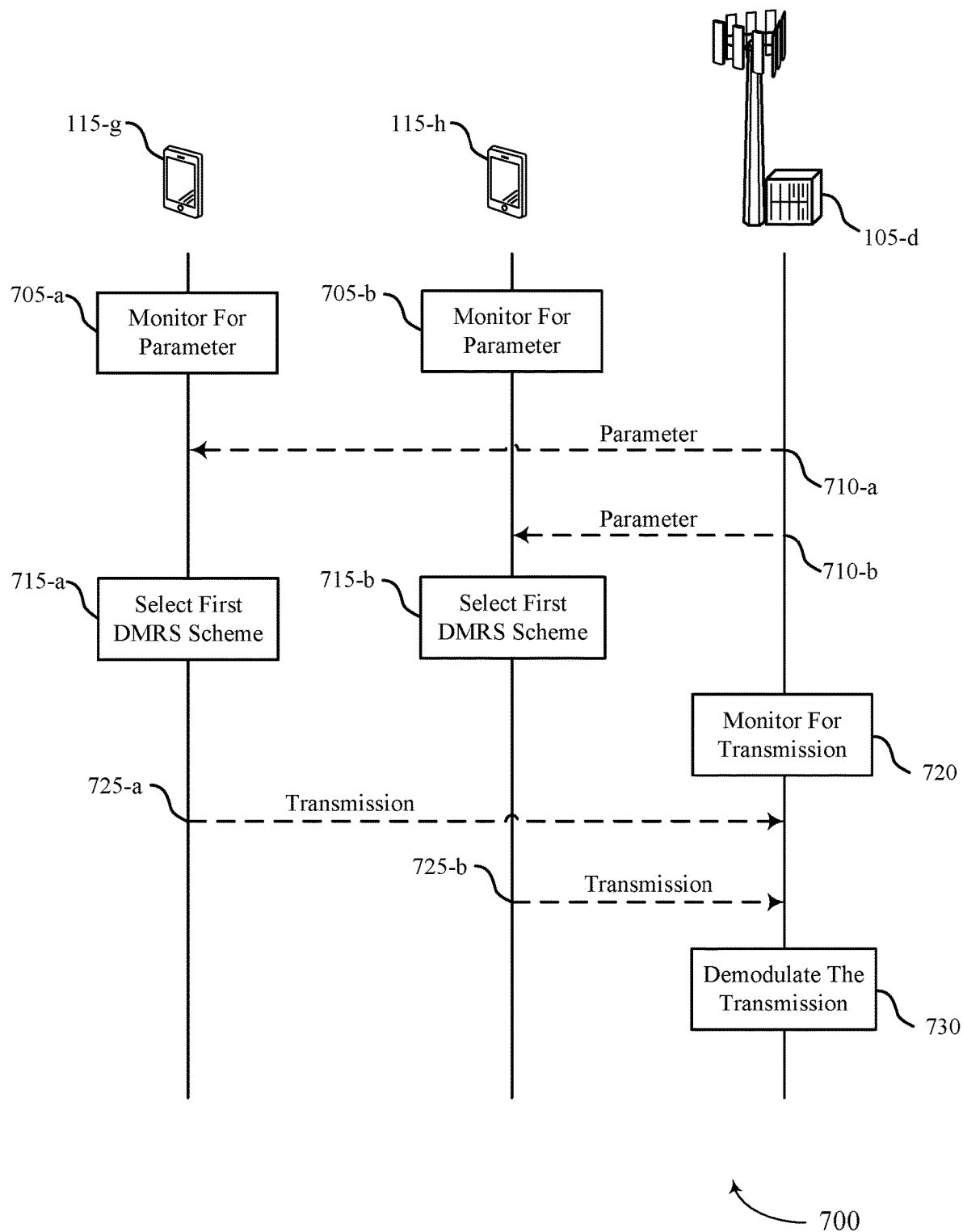
FIG. 7 illustrates an example of a process flow in accordance with aspects of the present disclosure.

FIG. 7 illustrates an example of a process flow 700 in accordance with aspects of the present disclosure. In some examples, process flow 700 may implement aspects of wireless communication systems 100, 400, 500, or 600. In the example of FIG. 7, the process flow 700 may include UEs 115-*g* and 115-*h* receiving signals from a base station 105-*d*, which may be examples of UEs 115 and base stations 105 of FIGS. 1, 4, 5, and 6. Further, process flow 700 may implement aspects of DMRS schemes 200 and 300.

At 705, UEs 115-*g* and 115-*h* may be monitoring for a parameter indicating which DMRS scheme of multiple DMRS schemes to use. The parameter may be an RRC parameter. That is, at 705-*a*, UE 115-*g* may be monitoring for a parameter from base station 105-*d* and at 705-*b*, UE 115-*h* may be monitoring for a parameter from base station 105-*d*. The parameter may indicate which DMRS multiplexing scheme each of the UEs 115-*g* and 115-*h* are to apply, and a respective DMRS index assigned to each of the UEs.

At 710, the UEs 115-*g* and 115-*h* may optionally receive a parameter that indicates which DMRS scheme to apply. Base station 105-*d* may configure UEs 115-*g* and 115-*h* to each transmit DMRSs on a same uplink resource (e.g., a same resource block, a same TTI) using a particular DMRS multiplexing scheme. That is, UEs 115-*g* and 115-*h* may be configured to simultaneously transmit uplink transmissions (e.g., PUSCH transmissions, PUCCH transmissions). At 710-*a*, UE 115-*g* may receive a parameter indicating a first DMRS scheme and at 710-*b*, UE 115-*h* may receive a parameter also indicating the first DMRS scheme. The parameter may include an indicator of a base DMRS sequence. Additionally or alternatively, the base station 105-*d* may indicate the base DMRS sequence to the UEs 115 separately from transmitting the parameters at 710. In some cases, the parameter may separately configure a DMRS scheme for a shared data channel (e.g., PUSCH) and a DMRS scheme for a control channel (e.g., PUCCH format 4). If the base station 105-*d* does not transmit a parameter, the UEs 115-*g* and 115-*h* may determine to use the first DMRS scheme based on a default DMRS scheme configuration.

At 710, the UEs 115-*g* and 115-*h* may receive an index (e.g., a DMRS index) respectively assigned to each of the UEs 115 of a set of different indexes. The index may be sent by the base station 105-*d* within the parameters 710. In another example, the index may be sent separately from the parameters. For example, the index may be sent by a DCI parameter. For example, the base station 105-*d* may transmit an index to UE 115-*g* by parameter 710-*a* and a different index to UE 115-*h* by parameter 710-*b*. For example, UE 115-*g* may receive a first index and UE 115-*h* may receive a second index different from the first index. The index may indicate one or more intra-symbol TD-OCC, or one or more cyclic shifts for DMRS symbol periods. That is, the UEs 115-*g* and 115-*h* may use their assigned indexes to reference tables (e.g., Tables 1 through 4 as discussed herein) to determine which intra-symbol TD-OCCs or cyclic shifts to apply to the DMRS base sequence. Thus, the index may indicate to each UE 115 DMRS schemes resulting in orthogonal DMRS transmissions from UE 115-*g* and UE 115-*h*.

At 715, the UEs 115-*g* and 115-*h* may select a DMRS scheme from the set of DMRS schemes based on the monitoring. UEs 115-*g* and 115-*h* may select a first DMRS scheme. The set of DMRS schemes may include an intra-symbol TD-OCC scheme and a TD cyclic-shift scheme. In some cases, the UEs 115-*g* and 115-*h* may select a DMRS scheme based on the parameter received from the base station 105-*d*. Additionally or alternatively, UEs 115-*g* and 115-*h* may select a defined DMRS scheme based on determining that the parameter has not been received from the base station 105-*d* (e.g., determined during the monitoring at 705). UEs 115-*g* and 115-*h* may select a default DMRS scheme based on determining that a parameter was not received from the base station 105-*d*. Once the UEs 115-*g* and 115-*h* select to apply the first DMRS scheme, each UE 115-*g* and 115-*h* may generate a DMRS sequence by applying an intra-symbol TD-OCC or a TD cyclic-shift to the base DMRS sequence based on the selected DMRS scheme and their assigned index. Therefore, UE 115-*g* and UE 115-*h* may each generate orthogonal DMRS sequences.

UE 115-*g* may identify an intra-symbol TD-OCC, a first cyclic shift for a first DMRS symbol period, and a second cyclic shift for second DMRS period based on the first index. In some other cases, UE 115-g may identify a first intra-symbol TD-OCC for a first DMRS symbol period and a second intra-symbol TD-OCC for a second DMRS signal period based on the first index. The UE 115-g may identify the first and second intra-symbol TD-OCCs by identifying an index of the first intra-symbol TD-OCC based on the symbol index of the first DMRS symbol period and the first index and identifying the index of the second intra-symbol TD-OCC based on a symbol index of the second DMRS symbol period and the first index. In some instances, the UE 115-g may identify a first intra-symbol TD-OCC hopping pattern of a set of intra-symbol TD-OCC hopping patterns based on the first index. In some examples, each of the hopping patterns may indicate respective indexes corresponding to a set of transmissions. For example, each of the TD-OCC hopping patterns may indicate the respective TD-OCC indexes corresponding to a set of transmissions.

The UE 115-h may identify a different intra-symbol TD-OCC, a third cyclic shift for a first DMRS symbol period, and a fourth cyclic shift for second DMRS period based on the second index. In some other cases, UE 115-h may identify a third intra-symbol TD-OCC for a first DMRS symbol period and a fourth intra-symbol TD-OCC for a second DMRS signal period based on the second index. The UE 115-h may identify the third and fourth intra-symbol TD-OCCs by identifying an index of the third intra-symbol TD-OCC based on the symbol index of the first DMRS symbol period and the second index and identifying the index of the fourth intra-symbol TD-OCC based on a symbol index of the second DMRS symbol period and the second index. In some instances, the UE 115-h may identify a second intra-symbol TD-OCC hopping pattern of a set of intra-symbol TD-OCC hopping patterns based on the second index.

At 720, the base station 105-d may monitor the scheduled transmission resources for uplink transmissions from UEs 115-g and 115-h that include a DMRS generated in accordance with the indicated DMRS scheme.

At 725, UEs 115-g and 115-h may transmit a transmission based on the selected DMRS schemes. That is, UE 115-g may transmit a transmission based on the first DMRS scheme and UE 115-h may transmit a transmission based on the first DMRS scheme. The UE 115-g and the UE 115-h may simultaneously transmit their transmissions that each include their DMRSs within a same uplink resource (e.g., a same resource block during a same DMRS symbol period). In some cases, the UEs 115-g and 115-h may transmit a shared data channel transmission including a DMRS generated in accordance with the selected DMRS scheme (e.g., the first DMRS scheme). The transmissions may further include a control channel transmission including a DMRS generating in accordance with the selected DMRS schemes. UEs 115-g and 115-h may generate the transmission 725 based on a $\pi/2$ binary phase shift keying modulation scheme. In some cases, the transmissions 725 may be an uplink transmission to base station 105-d.

UE 115-g may transmit a first DMRS transmission using the intra-symbol TD-OCC having the first cyclic shift in the first DMRS symbol period and transmit a second DMRS using the intra-symbol TD-OCC having the second cyclic shift in the second DMRS symbol period, where the first cyclic shift is different from the second cyclic shift. In some other cases, UE 115-g may transmit a first DMRS transmission using the first intra-symbol TD-OCC in the first DMRS and a second DMRS transmission using the second intra-symbol TD-OCC in the second DMRS symbol period, where the first intra-symbol TD-OCC is different than the second intra-symbol TD-OCC. In some instances, UE 115-g may transmit a set of transmissions in accordance with the first intra-symbol TD-OCC hopping pattern. The set of transmissions may be a set of control channel transmissions. Additionally or alternatively, the set of transmissions may be a set of shared data channel transmissions.

UE 115-h may transmit a third DMRS transmission using the intra-symbol TD-OCC having the third cyclic shift in the first DMRS symbol period and transmit a fourth DMRS using the intra-symbol TD-OCC having the fourth cyclic shift in the second DMRS symbol period, where the third cyclic shift is different from the first cyclic shift. In some instances, UE 115-h may transmit a set of transmissions in accordance with the second intra-symbol TD-OCC hopping pattern. The set of transmissions may be a set of control channel transmissions. Additionally or alternatively, the set of transmissions may be a set of shared data channel transmissions.

At 730, base station 105-d may demodulate one or more transmissions based on the first DMRS scheme. The UE 115-h may transmit 725-b by the same uplink resources as UE 115-g transmits transmission 725-a. For example, the base station 105-d may demodulate the shared data channel transmission (e.g., the transmissions 725-a and 725-b transmitted by the same uplink transmission resources) based on the orthogonal DMRS sequences corresponding to the DMRS scheme indicated to UEs 115-g and 115-h and their respectively assigned indexes. Additionally or alternatively, the base station 105-d may demodulate the control channel transmission in a similar manner. The base station 105-d may demodulate the transmission based on a $\pi/2$ binary phase shift keying modulation scheme and the indicated DMRS scheme. In some instances, the base station 105-d may decode a transmission resource to decode transmission 725-a from the UE 115-g based on the base DMRS sequence and the first index assigned to UE 115-g. Additionally or alternatively, the base station 105-d may decode the transmission resource to decode transmission 725-b from UE 115-h based on the base DMRS and the second index assigned to UE 115-h.

Decoding the transmission resource to decode transmission 725-a may include the base station 105-d generating a first orthogonal DMRS sequence based on the base DMRS sequence and the first index and decoding the transmission resource to decode the first transmission from the UE 115-g based on the first orthogonal DMRS. In some cases, decoding the transmission resource to decode the transmission 725-b may include the base station 105-d generating a second orthogonal DMRS sequence based on the base DMRS and the second index and decoding the transmission 725-b based on the second orthogonal DMRS sequence. The base station 105-d may transmit an acknowledgement (ACK) or negative ACK (NACK) (e.g., to UEs 115-g or 115-h) corresponding to whether decoding the transmissions 725-a and/or 725-b was successful. In some cases, the base station 105-d may transmit information (e.g., based on the transmissions 725) to either the UE 115-g, the U115-h, or both, in subsequent downlink transmissions.

Figure 8:
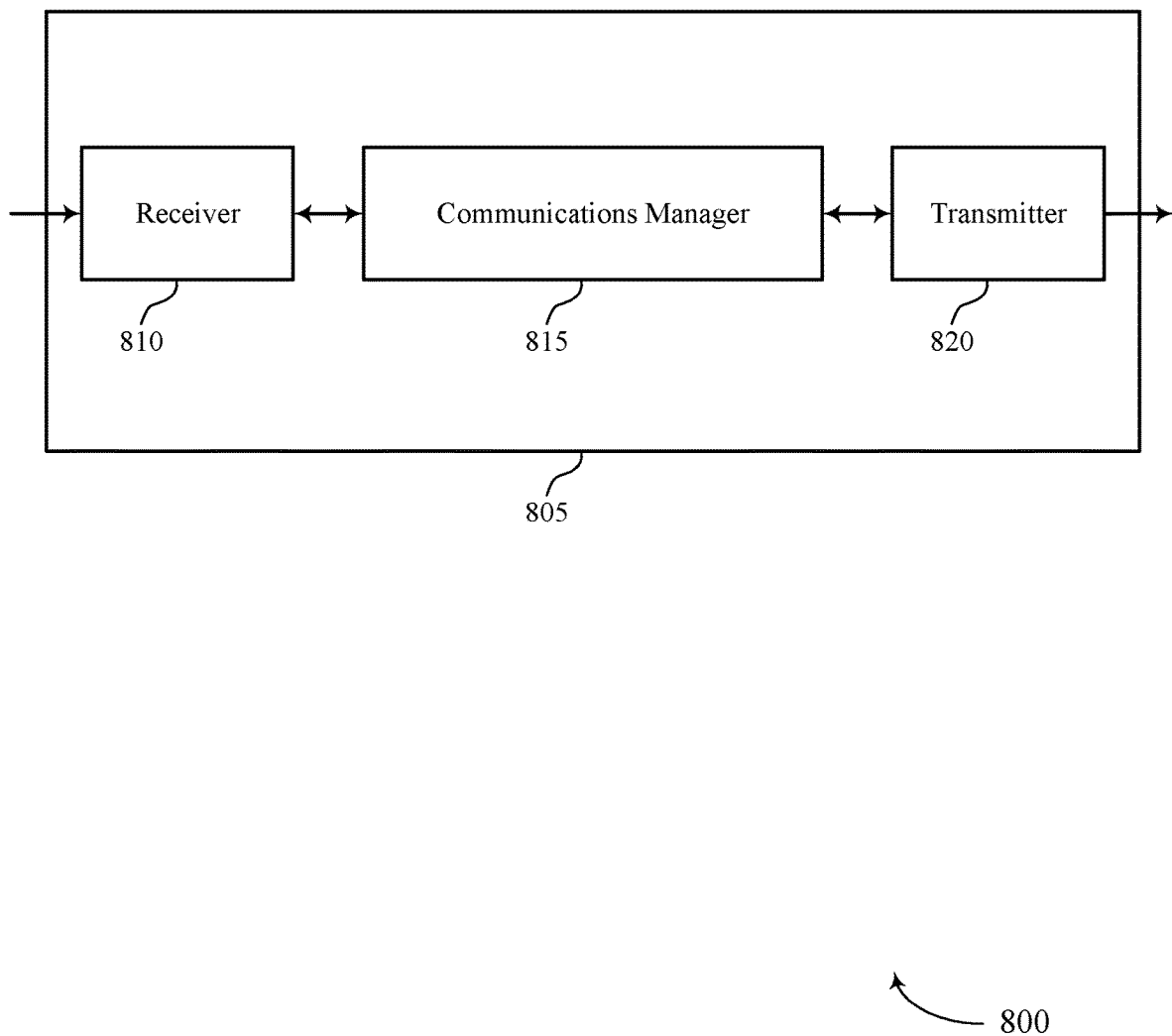
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to DMRS multiplexing scheme selection for uplink transmission, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may monitor for a parameter indicating which DMRS scheme of a set of DMRS schemes to use, select a first DMRS scheme of the set of DMRS schemes based on the monitoring, and transmit a transmission based on the first DMRS scheme. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
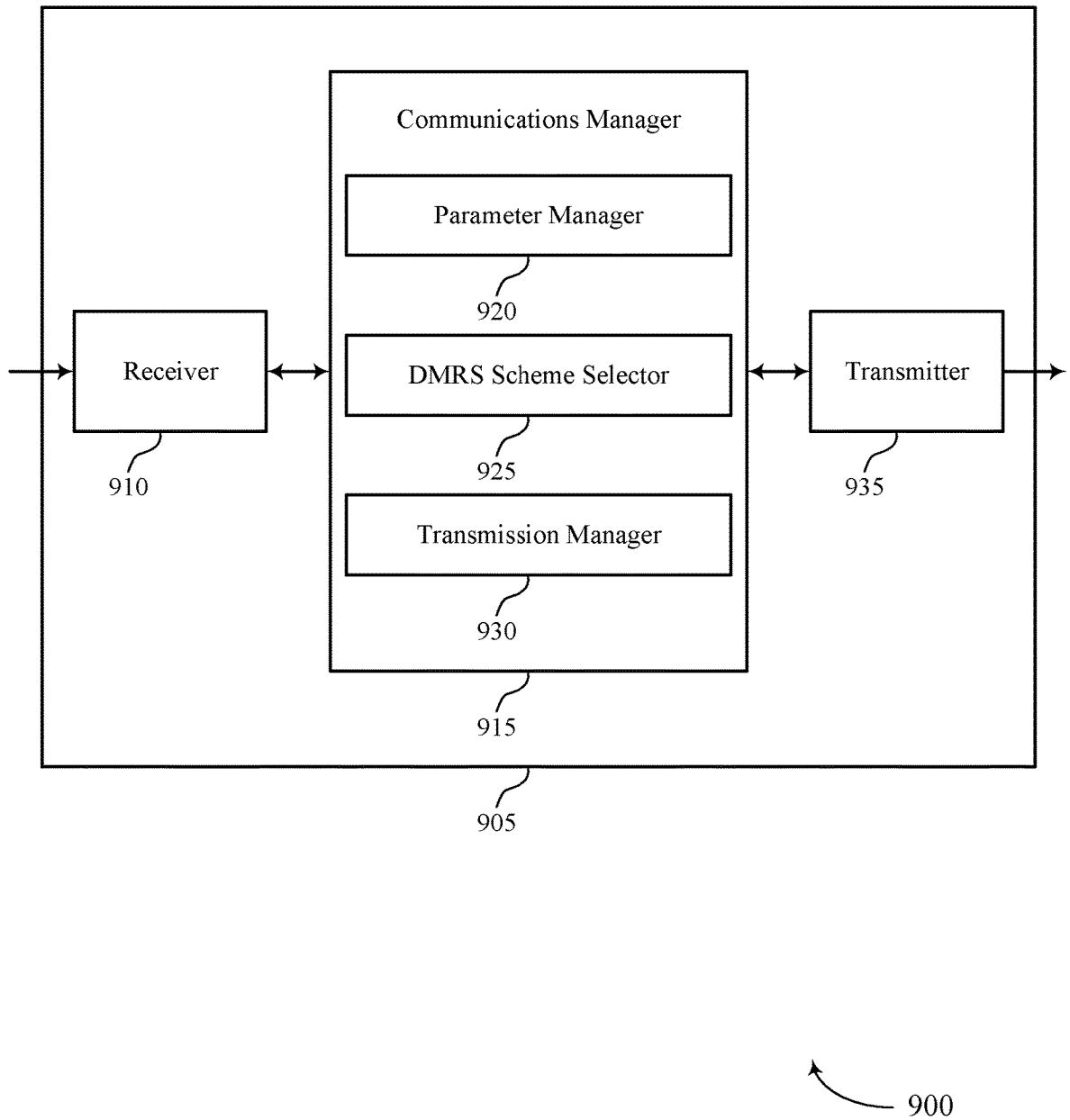

FIG. 9 shows a block diagram 900 of a device 905 in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to DMRS multiplexing scheme selection for uplink transmission, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a parameter manager 920, a DMRS scheme selector 925, and a transmission manager 930. The communications manager 915 may be an example of aspects of the communications manager 1110 described herein.

The parameter manager 920 may monitor for a parameter indicating which DMRS scheme of a set of DMRS schemes to use. The DMRS scheme selector 925 may select a first DMRS scheme of the set of DMRS schemes based on the monitoring. The transmission manager 930 may transmit a transmission based on the first DMRS scheme.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
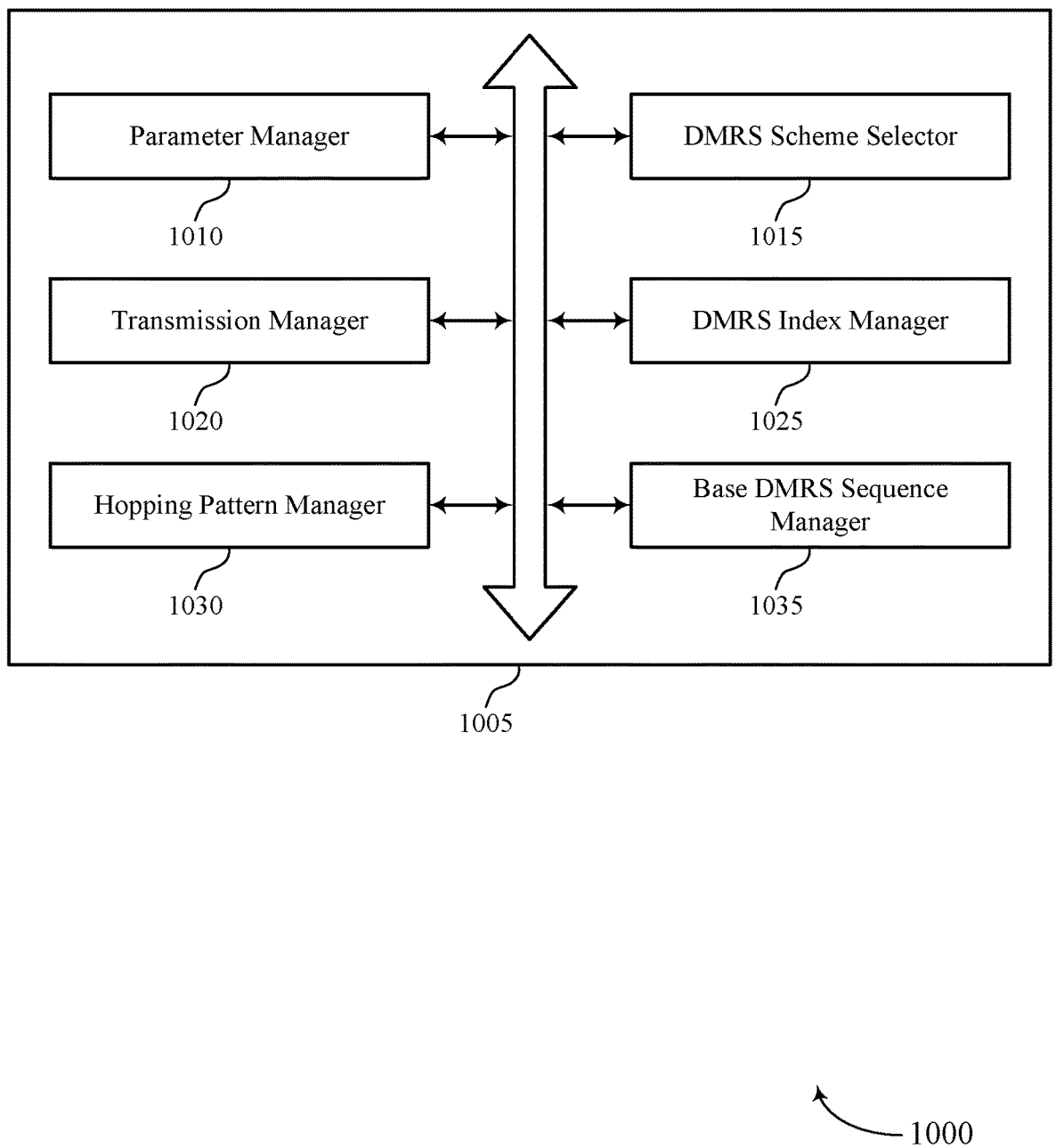
FIG. 10 shows a block diagram of a communications manager in accordance with aspects of the present disclosure.

FIG. 10 shows a block diagram 1000 of a communications manager 1005 in accordance with aspects of the present disclosure. The communications manager 1005 may be an example of aspects of a communications manager 815, a communications manager 915, or a communications manager 1110 described herein. The communications manager 1005 may include a parameter manager 1010, a DMRS scheme selector 1015, a transmission manager 1020, a DMRS index manager 1025, a hopping pattern manager 1030, and a base DMRS sequence manager 1035. Each of these modules may communicate, directly or indirectly, with one another (e.g., via one or more buses).

The parameter manager 1010 may monitor for a parameter indicating which DMRS scheme of a set of DMRS schemes to use. In some examples, the parameter manager 1010 may receive the parameter that indicates the first DMRS scheme. In some cases, the parameter is an RRC parameter. In some instances, the parameter is an RRC parameter that separately configures a DMRS scheme for a shared data channel and a DMRS scheme for a control channel.

The DMRS scheme selector 1015 may select a first DMRS scheme of the set of DMRS schemes based on the monitoring. In some examples, the DMRS scheme selector 1015 may identify an intra-symbol TD-OCC, a first cyclic shift for a first DMRS symbol period, and a second cyclic shift for a second DMRS symbol period based on the first index. In some examples, the DMRS scheme selector 1015 may identify a first intra-symbol TD-OCC for a first DMRS symbol period and a second intra-symbol TD-OCC for a second DMRS symbol period based on the first index. In some examples, the DMRS scheme selector 1015 may identify an index of the first intra-symbol TD-OCC based on a symbol index of the first DMRS symbol period and the first index. In some cases, the DMRS scheme selector 1015 may identify an index of the second intra-symbol TD-OCC based on a symbol index of the second DMRS symbol period and the first index. In some instances, the DMRS scheme selector 1015 may select a defined DMRS scheme based on the monitoring indicating that the parameter has not been received. In some cases, the set of DMRS schemes includes an intra-symbol TD-OCC scheme and a time domain cyclic shift scheme.

The transmission manager 1020 may transmit a transmission based on the first DMRS scheme. In some examples, the transmission manager 1020 may transmit a first DMRS transmission using the intra-symbol TD-OCC having the first cyclic shift in the first DMRS symbol period. In some cases, the transmission manager 1020 may transmit a second DMRS transmission using the intra-symbol TD-OCC having the second cyclic shift in the second DMRS symbol period, the first cyclic shift differing from the second cyclic shift. In some instances, the transmission manager 1020 may transmit a first DMRS transmission using the first intra-symbol TD-OCC in the first DMRS symbol period. In some examples, the transmission manager 1020 may transmit a second DMRS transmission using the second intra-symbol TD-OCC in the second DMRS symbol period, the first intra-symbol TD-OCC differing from the second intra-symbol TD-OCC.

In some examples, the transmission manager 1020 may transmit a set of transmissions in accordance with the first intra-symbol TD-OCC hopping pattern. In some examples, the transmission manager 1020 may transmit a shared data channel transmission including a DMRS generated in accordance with the first DMRS scheme. In some examples, the transmission manager 1020 may transmit a control channel transmission including a DMRS generated in accordance with the first DMRS scheme. In some examples, the transmission manager 1020 may generate the transmission based on a π/2 binary phase shift keying modulation scheme. In some cases, the set of transmissions are a set of control channel transmissions. In some cases, the set of transmissions are a set of shared data channel transmissions. In some cases, the transmission is an uplink transmission to a base station.

The DMRS index manager 1025 may receive a first index assigned to the UE of a set of different indexes. In some examples, the DMRS index manager 1025 may receive a first index assigned to the UE of a set of different indexes.

The hopping pattern manager 1030 may identify a first intra-symbol TD-OCC hopping pattern of a set of intra-symbol TD-OCC hopping patterns based on the first index.

The base DMRS sequence manager 1035 may determine a base DMRS sequence. In some examples, the base DMRS sequence manager 1035 may generate an orthogonal DMRS sequence by applying an intra-symbol TD-OCC or a time domain cyclic shift to the base DMRS sequence based on the first DMRS scheme.

Figure 11:
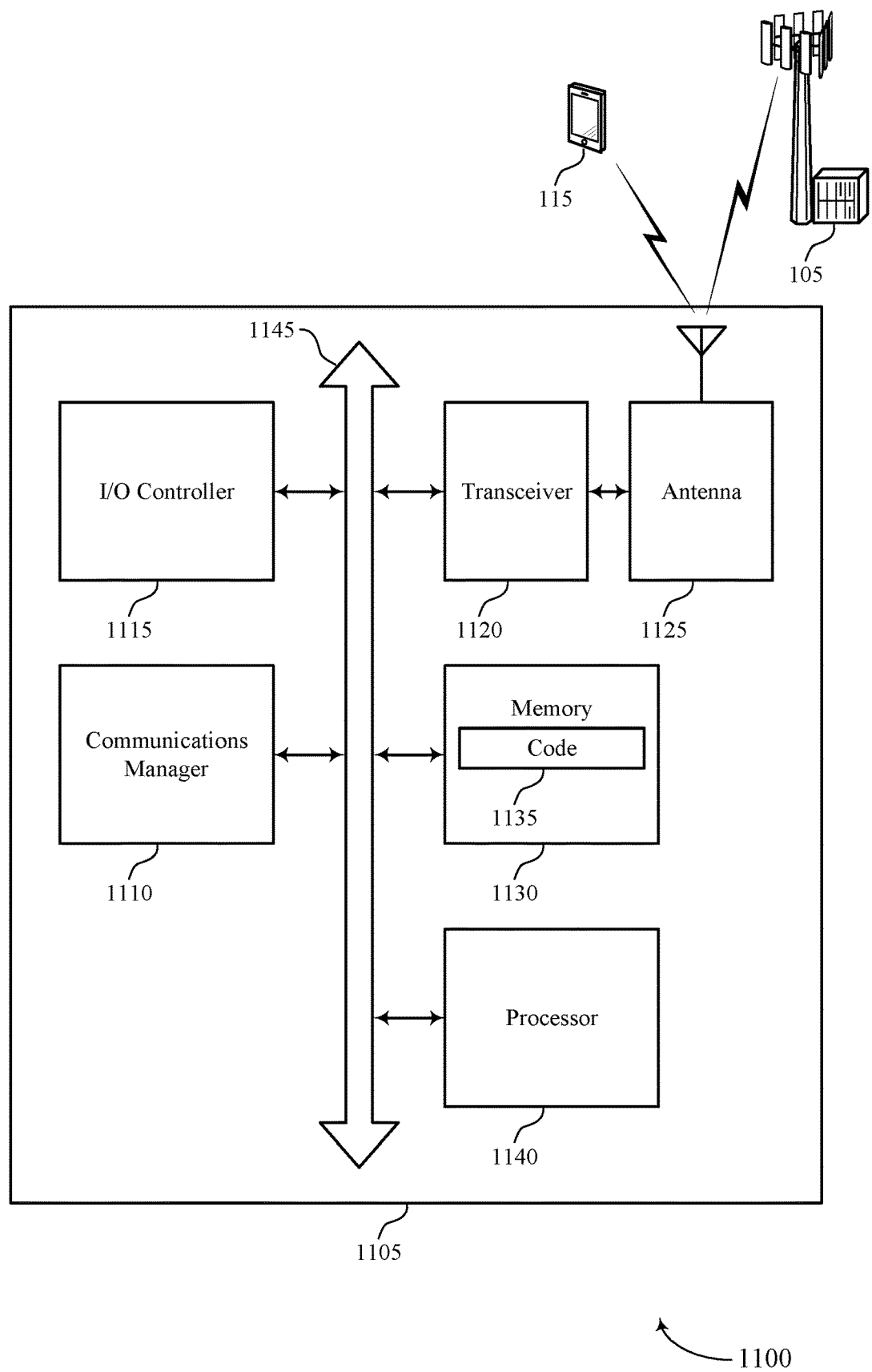
FIG. 11 shows a diagram of a system in accordance with aspects of the present disclosure.

FIG. 11 shows a diagram of a system 1100 including a device 1105 in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may monitor for a parameter indicating which DMRS scheme of a set of DMRS schemes to use, select a first DMRS scheme of the set of DMRS schemes based on the monitoring, and transmit a transmission based on the first DMRS scheme.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DMRS multiplexing scheme selection for uplink transmission).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
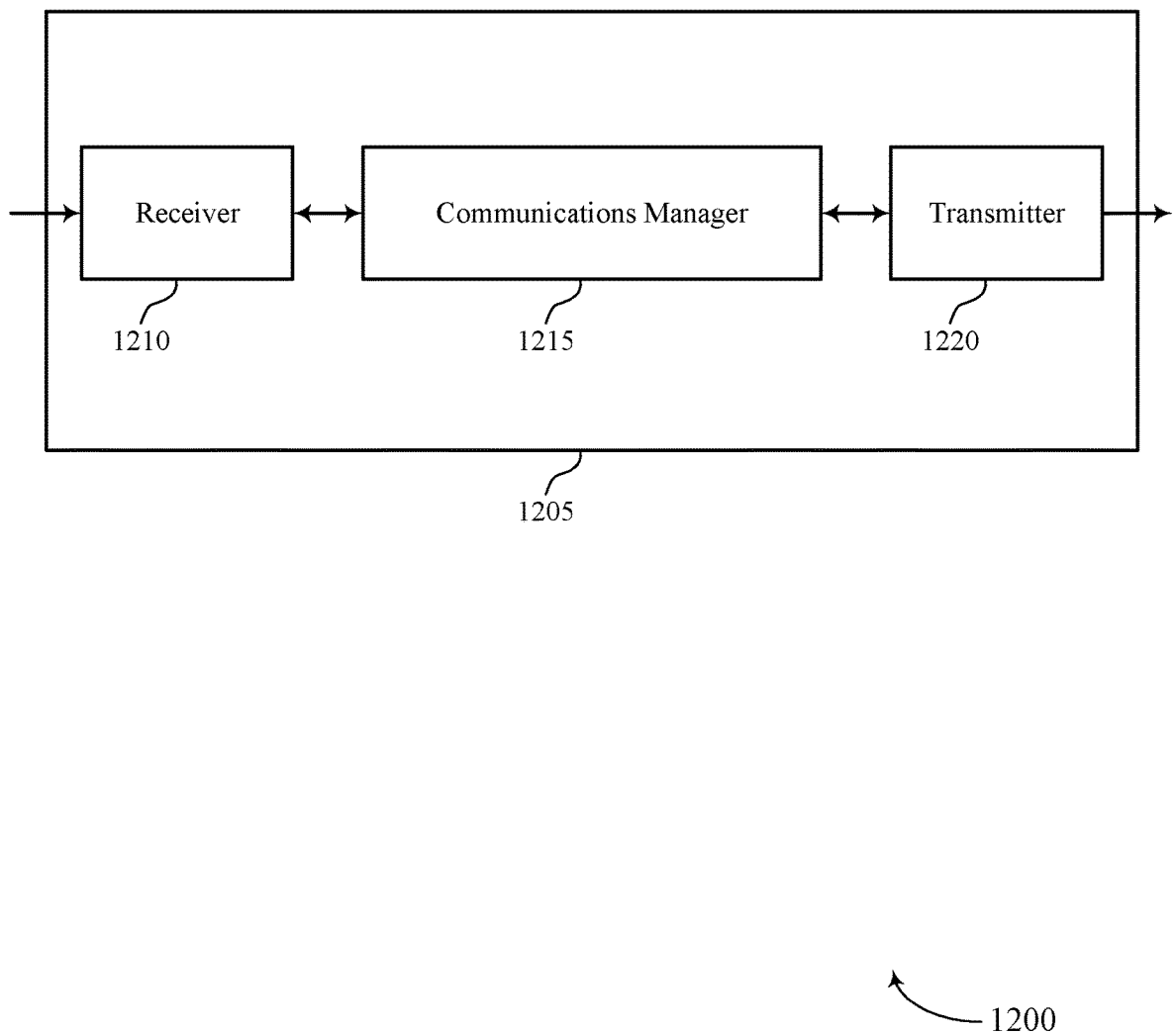
FIGS. 12 and 13 show block diagrams of devices in accordance with aspects of the present disclosure.

FIG. 12 shows a block diagram 1200 of a device 1205 in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to DMRS multiplexing scheme selection for uplink transmission, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a parameter indicating that a UE is to use a first DMRS scheme of a set of DMRS schemes and monitor for a transmission from the UE generated based on the first DMRS scheme. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
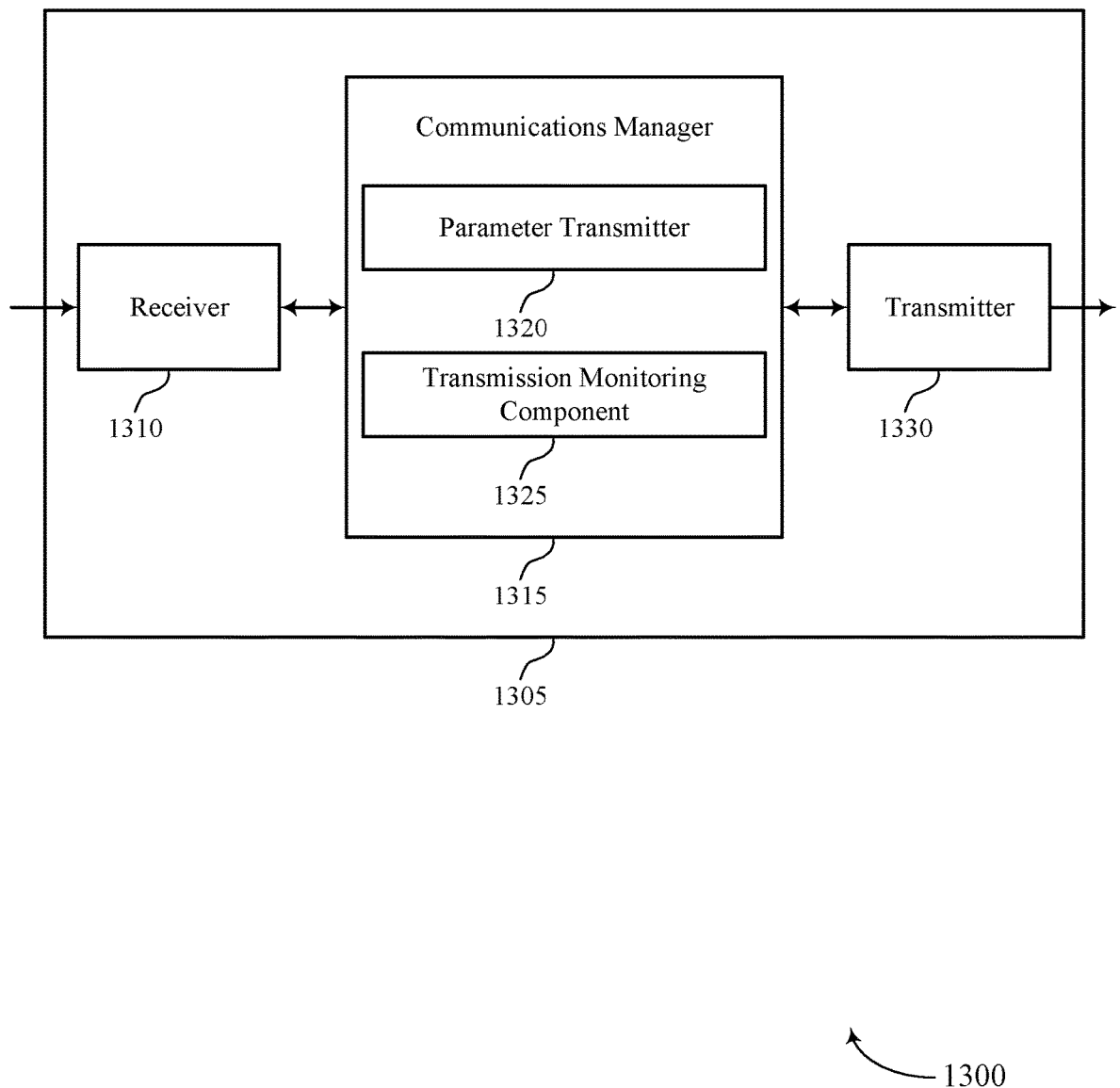

FIG. 13 shows a block diagram 1300 of a device 1305 in accordance with aspects of the present disclosure. The device 1305 may be an example of aspects of a device 1205, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to DMRS multiplexing scheme selection for uplink transmission, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a parameter transmitter 1320 and a transmission monitoring component 1325. The communications manager 1315 may be an example of aspects of the communications manager 1510 described herein.

The parameter transmitter 1320 may transmit a parameter indicating that a UE is to use a first DMRS scheme of a set of DMRS schemes.

The transmission monitoring component 1325 may monitor for a transmission from the UE generated based on the first DMRS scheme.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1520 described with reference to FIG. 15. The transmitter 1330 may utilize a single antenna or a set of antennas.

Figure 14:
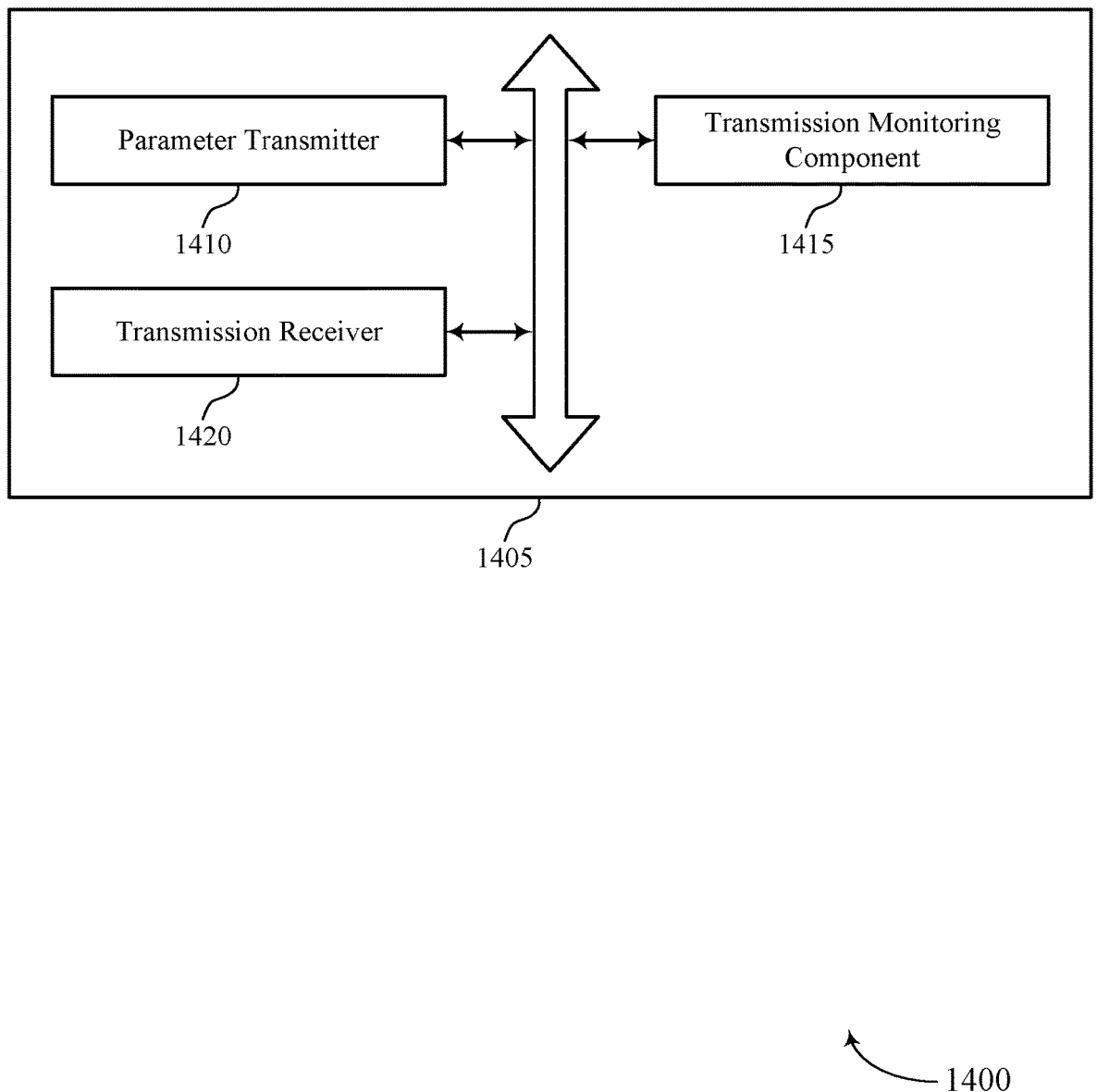
FIG. 14 shows a block diagram of a communications manager in accordance with aspects of the present disclosure.

FIG. 14 shows a block diagram 1400 of a communications manager 1405 in accordance with aspects of the present disclosure. The communications manager 1405 may be an example of aspects of a communications manager 1215, a communications manager 1315, or a communications manager 1510 described herein. The communications manager 1405 may include a parameter transmitter 1410, a transmission monitoring component 1415, and a transmission receiver 1420. Each of these modules may communicate, directly or indirectly, with one another (e.g., via one or more buses).

The parameter transmitter 1410 may transmit a parameter indicating that a UE is to use a first DMRS scheme of a set of DMRS schemes. In some examples, the parameter transmitter 1410 may transmit a first index assigned to the UE of a set of different indexes that indicates an intra-symbol TD-OCC, a first cyclic shift for a first DMRS symbol period, and a second cyclic shift for a second DMRS symbol period. In some cases, the parameter transmitter 1410 may transmit a second index assigned to a second UE of the set of different indexes that indicates a second intra-symbol TD-OCC that differs from the intra-symbol TD-OCC.

In some examples, the parameter transmitter 1410 may transmit a first index assigned to the UE of a set of different indexes that indicates a first intra-symbol TD-OCC for a first DMRS symbol period and a second intra-symbol TD-OCC for a second DMRS symbol period based on the first index. In some examples, the parameter transmitter 1410 may transmit a first index assigned to the UE of a set of different indexes that indicates a first intra-symbol TD-OCC hopping pattern of a set of intra-symbol TD-OCC hopping patterns.

In some examples, the parameter transmitter 1410 may transmit an indicator of a base DMRS sequence to a first UE and a second UE, an indicator of a first index assigned to the first UE and an indicator of a second index assigned to the second UE. In some cases, the parameter is an RRC parameter. In some cases, the parameter is an RRC parameter that separately configures a DMRS scheme for a shared data channel and a DMRS scheme for a control channel.

The transmission monitoring component 1415 may monitor for a transmission from the UE generated based on the first DMRS scheme. In some examples, the transmission monitoring component 1415 may receive a first DMRS transmission generated using the intra-symbol TD-OCC having the first cyclic shift in the first DMRS symbol period. In some cases, the transmission monitoring component 1415 may receive a second DMRS transmission generated using the intra-symbol TD-OCC having the second cyclic shift in the second DMRS symbol period, the first cyclic shift differing from the second cyclic shift.

In some examples, the transmission monitoring component 1415 may receive a first DMRS transmission generated using the first intra-symbol TD-OCC in the first DMRS symbol period. In some examples, the transmission monitoring component 1415 may receive a second DMRS transmission generated using the second intra-symbol TD-OCC in the second DMRS symbol period, the first intra-symbol TD-OCC differing from the second intra-symbol TD-OCC. In some cases, the transmission monitoring component 1415 may receive a shared data channel transmission including a DMRS generated in accordance with the first DMRS scheme. In some instances, the transmission monitoring component 1415 may demodulate the shared data channel transmission based on the DMRS.

In some examples, the transmission monitoring component 1415 may receive a control channel transmission including a DMRS generated in accordance with the first DMRS scheme. In some cases, the transmission monitoring component 1415 may demodulate the control channel transmission based on the DMRS. In some instances, the transmission monitoring component 1415 may receive the transmission including a DMRS generated in accordance with the first DMRS scheme.

In some examples, the transmission monitoring component 1415 may demodulate the transmission based on a π/2 binary phase shift keying modulation scheme and the DMRS. In some cases, the transmission is an uplink transmission from the UE to the base station. In some cases, the set of DMRS schemes includes an intra-symbol TD-OCC scheme and a time domain cyclic shift scheme.

The transmission receiver 1420 may receive a set of transmissions generated in accordance with the first intra-symbol TD-OCC hopping pattern. In some examples, the transmission receiver 1420 may decode a transmission resource to decode a first transmission from the first UE based on the base DMRS sequence and the first index. In some cases, the transmission receiver 1420 may decode the transmission resource to decode a second transmission from the second UE based on the base DMRS sequence and the second index. In some cases, the set of transmissions are a set of control channel transmissions. In some cases, the set of transmissions are a set of shared data channel transmissions.

In some examples, the transmission receiver 1420 may generate a first orthogonal DMRS sequence based on the base DMRS sequence and the first index. In some instances, the transmission receiver 1420 may decode the transmission resource to decode the first transmission from the first UE based on the first orthogonal DMRS sequence. In some examples, the transmission receiver 1420 may generate a second orthogonal DMRS sequence based on the base DMRS sequence and the second index. In some examples, the transmission receiver 1420 may decode the transmission resource to decode the second transmission from the second UE based on the second orthogonal DMRS sequence.

Figure 15:
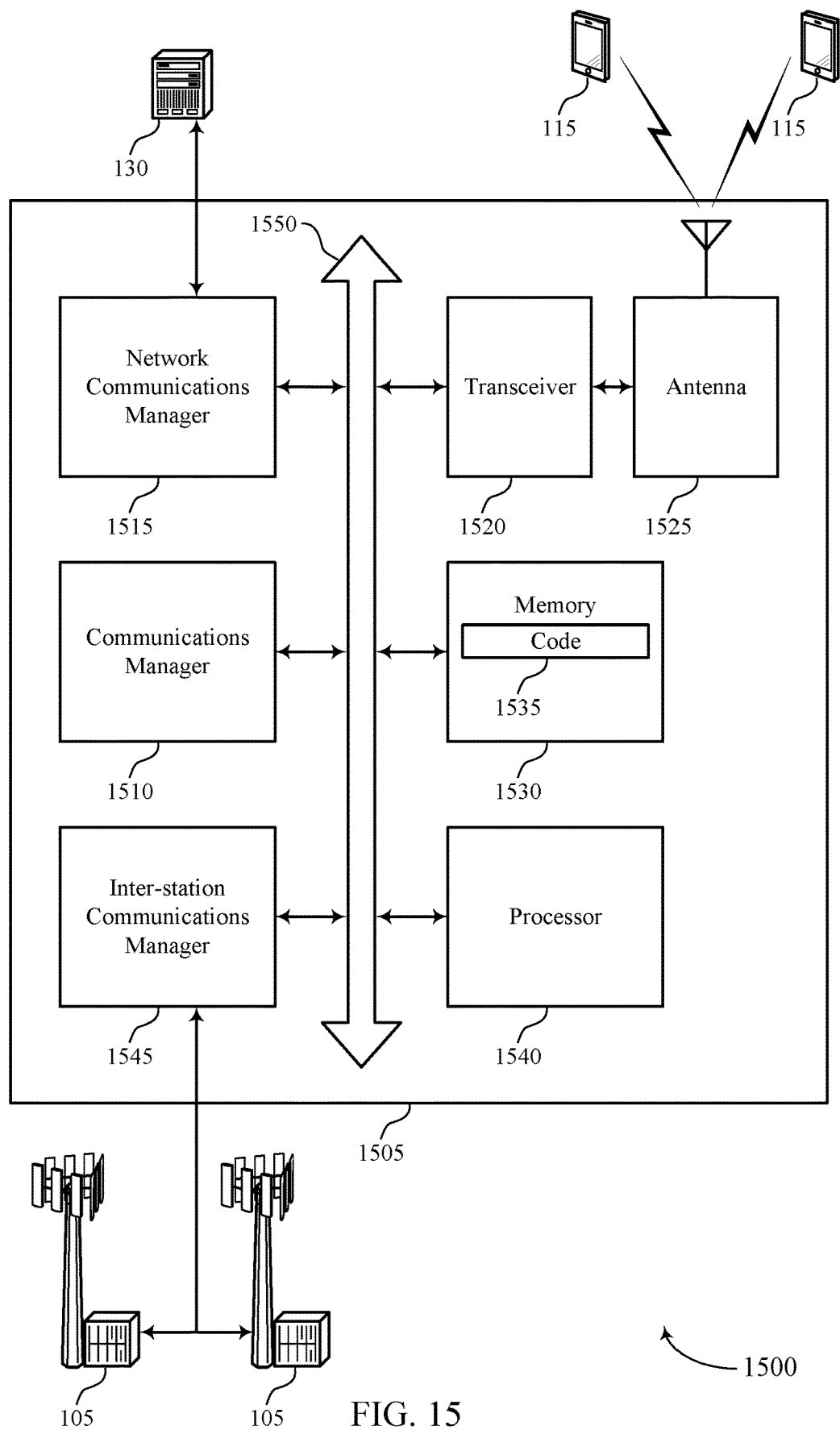
FIG. 15 shows a diagram of a system including a device in accordance with aspects of the present disclosure.

FIG. 15 shows a diagram of a system 1500 including a device 1505 in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a parameter indicating that a UE is to use a first DMRS scheme of a set of DMRS schemes and monitor for a transmission from the UE generated based on the first DMRS scheme.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting DMRS multiplexing scheme selection for uplink transmission).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
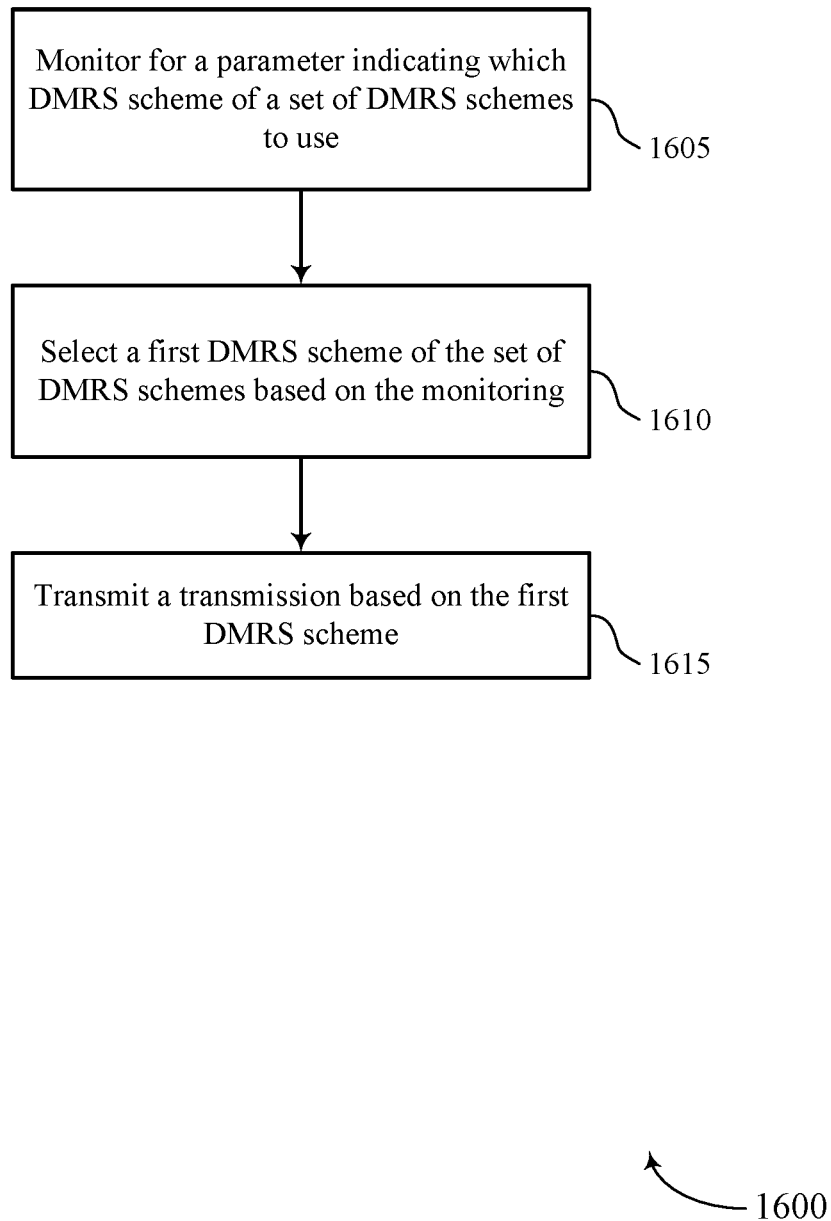
FIGS. 16 through 19 show flowcharts illustrating methods in accordance with aspects of the present disclosure.

FIG. 16 shows a flowchart illustrating a method 1600 in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may monitor for a parameter indicating which DMRS scheme of a set of DMRS schemes to use. The operations of 1605 may be performed according to the methods described herein. In some examples, aspects of the operations of 1605 may be performed by a parameter manager as described with reference to FIGS. 8 through 11.

At 1610, the UE may select a first DMRS scheme of the set of DMRS schemes based on the monitoring. The operations of 1610 may be performed according to the methods described herein. In some examples, aspects of the operations of 1610 may be performed by a DMRS scheme selector as described with reference to FIGS. 8 through 11.

At 1615, the UE may transmit a transmission based on the first DMRS scheme. The operations of 1615 may be performed according to the methods described herein. In some examples, aspects of the operations of 1615 may be performed by a transmission manager as described with reference to FIGS. 8 through 11.

Figure 17:
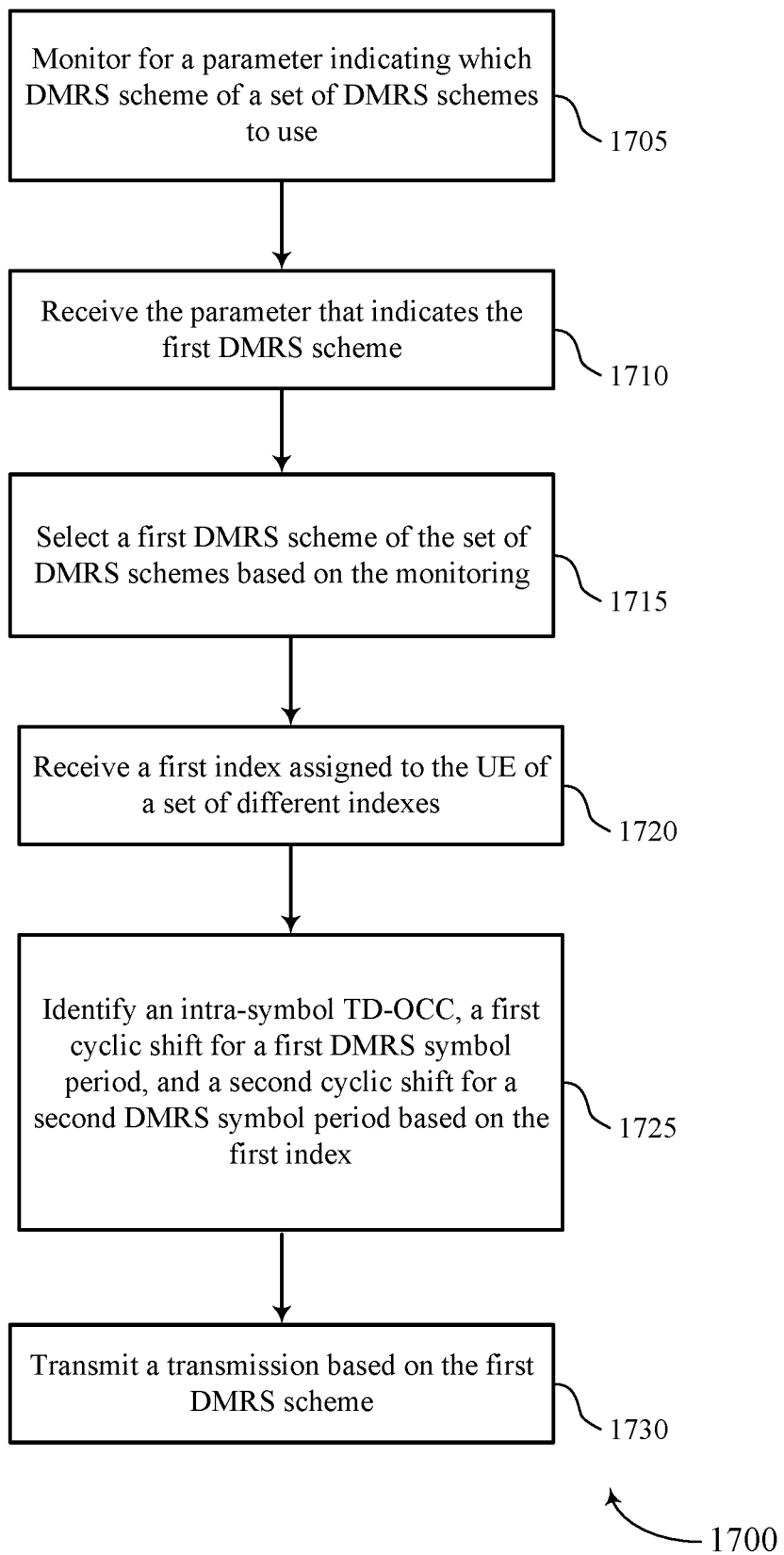

FIG. 17 shows a flowchart illustrating a method 1700 in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may monitor for a parameter indicating which DMRS scheme of a set of DMRS schemes to use. The operations of 1705 may be performed according to the methods described herein. In some examples, aspects of the operations of 1705 may be performed by a parameter manager as described with reference to FIGS. 8 through 11.

At 1710, the UE may receive the parameter that indicates the first DMRS scheme. The operations of 1710 may be performed according to the methods described herein. In some examples, aspects of the operations of 1710 may be performed by a parameter manager as described with reference to FIGS. 8 through 11.

At 1715, the UE may select a first DMRS scheme of the set of DMRS schemes based on the monitoring. The operations of 1715 may be performed according to the methods described herein. In some examples, aspects of the operations of 1715 may be performed by a DMRS scheme selector as described with reference to FIGS. 8 through 11.

At 1720, the UE may receive a first index assigned to the UE of a set of different indexes. The index may indicate one or more intra-symbol TD-OCC, or one or more cyclic shifts for DMRS symbol periods. That is, the UE may use its assigned index to reference a LUT (e.g., Tables 1 through 4 as discussed herein) to determine which intra-symbol TD-OCCs or cyclic shifts to apply to a DMRS base sequence. The operations of 1720 may be performed according to the methods described herein. In some examples, aspects of the operations of 1720 may be performed by a DMRS index manager as described with reference to FIGS. 8 through 11.

At 1725, the UE may identify an intra-symbol TD-OCC, a first cyclic shift for a first DMRS symbol period, and a second cyclic shift for a second DMRS symbol period based on the first index. The UE may apply the identified intra-symbol TD-OCC, first cyclic shift for the first DMRS symbol period, and the second cyclic shift for the second DMRS symbol period to the base DMRS sequence. The operations of 1725 may be performed according to the methods described herein. In some examples, aspects of the operations of 1720 may be performed by a DMRS scheme selector as described with reference to FIGS. 8 through 11.

At 1730, the UE may transmit a transmission based on the first DMRS scheme. The operations of 1730 may be performed according to the methods described herein. In some examples, aspects of the operations of 1730 may be performed by a transmission manager as described with reference to FIGS. 8 through 11.

Figure 18:
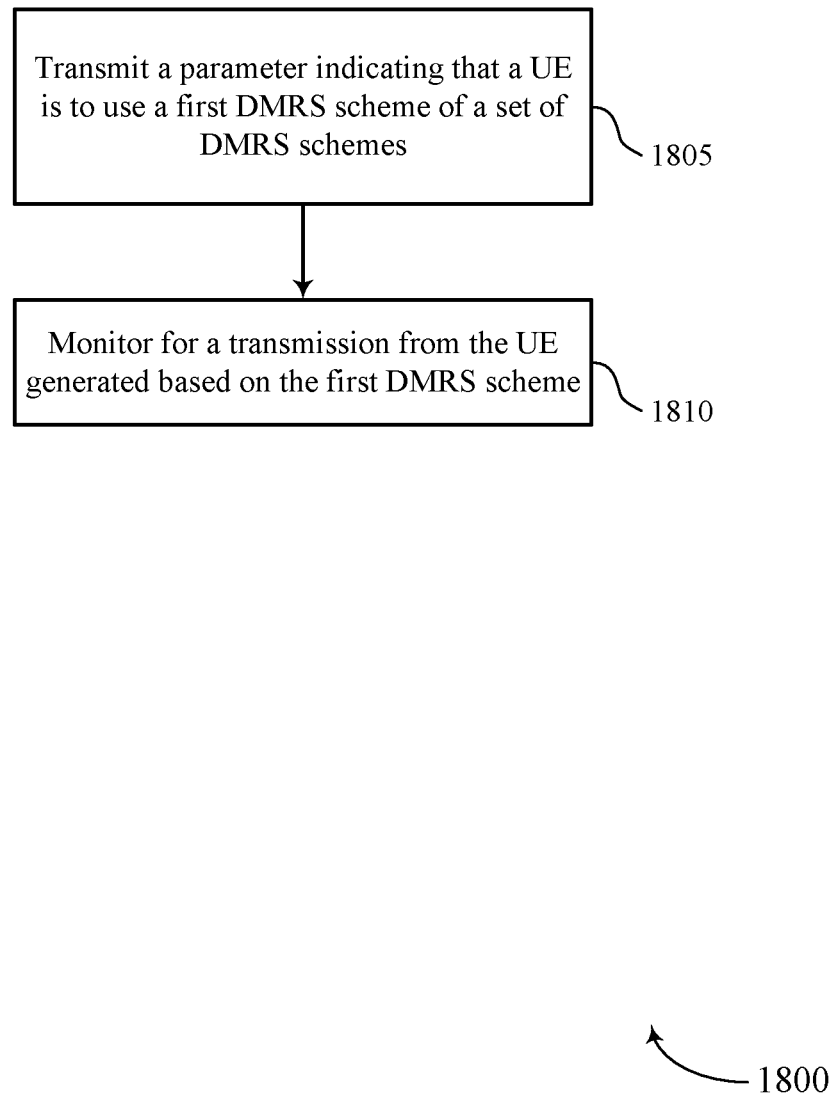

FIG. 18 shows a flowchart illustrating a method 1800 in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1805, the base station may transmit a parameter indicating that a UE is to use a first DMRS scheme of a set of DMRS schemes. The operations of 1805 may be performed according to the methods described herein. In some examples, aspects of the operations of 1805 may be performed by a parameter transmitter as described with reference to FIGS. 12 through 15.

At 1810, the base station may monitor for a transmission from the UE generated based on the first DMRS scheme. The operations of 1810 may be performed according to the methods described herein. In some examples, aspects of the operations of 1810 may be performed by a transmission monitoring component as described with reference to FIGS. 12 through 15.

Figure 19:
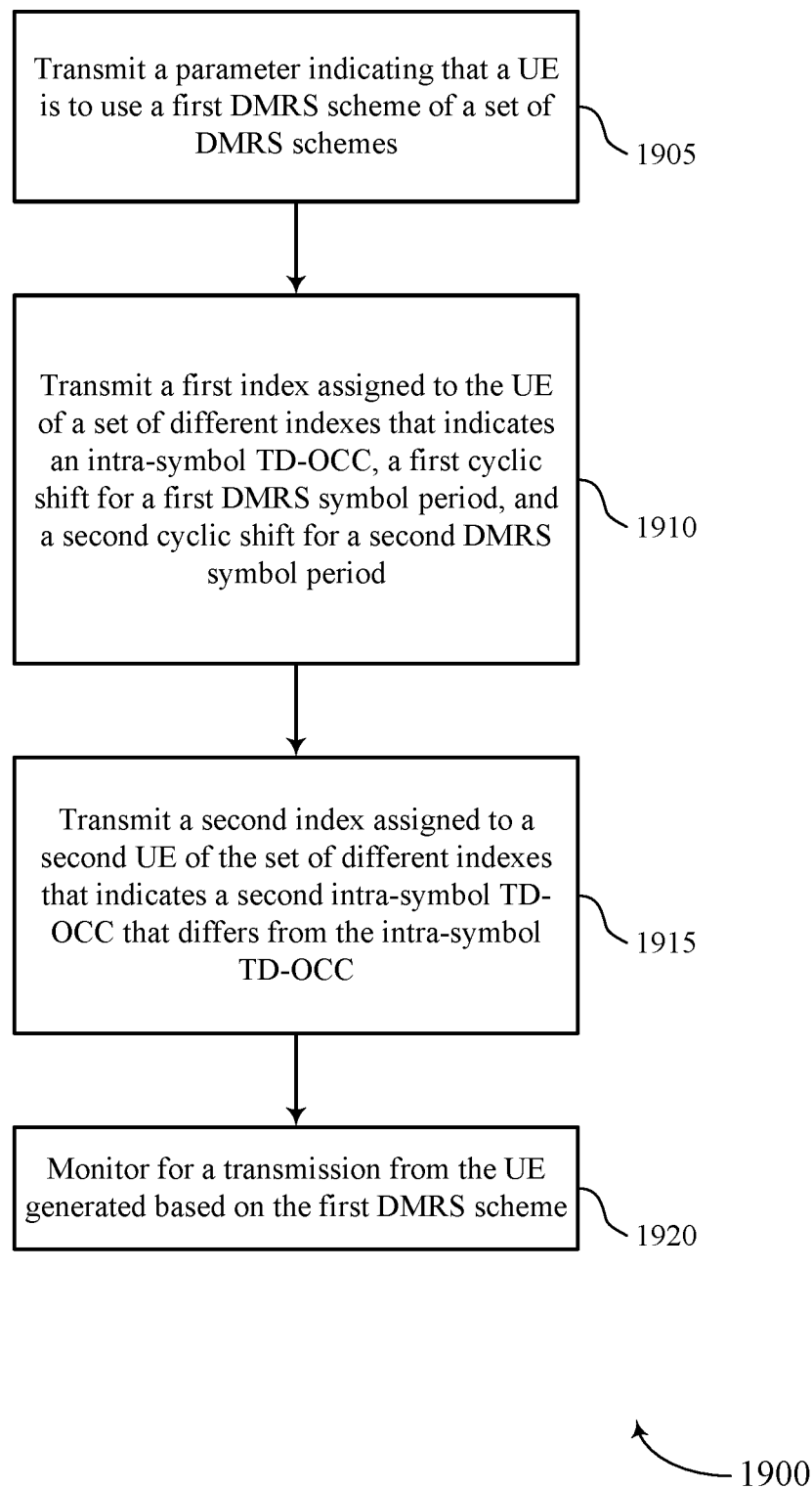

FIG. 19 shows a flowchart illustrating a method 1900 in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit a parameter indicating that a UE is to use a first DMRS scheme of a set of DMRS schemes. The operations of 1905 may be performed according to the methods described herein. In some examples, aspects of the operations of 1905 may be performed by a parameter transmitter as described with reference to FIGS. 12 through 15.

At 1910, the base station may transmit a first index assigned to the UE of a set of different indexes that indicates an intra-symbol TD-OCC, a first cyclic shift for a first DMRS symbol period, and a second cyclic shift for a second DMRS symbol period. The operations of 1910 may be performed according to the methods described herein. In some examples, aspects of the operations of 1910 may be performed by a parameter transmitter as described with reference to FIGS. 12 through 15.

At 1915, the base station may transmit a second index assigned to a second UE of the set of different indexes that indicates a second intra-symbol TD-OCC that differs from the intra-symbol TD-OCC. The operations of 1915 may be performed according to the methods described herein. In some examples, aspects of the operations of 1915 may be performed by a parameter transmitter as described with reference to FIGS. 12 through 15.

At 1920, the base station may monitor for a transmission from the UE generated based on the first DMRS scheme. The operations of 1920 may be performed according to the methods described herein. In some examples, aspects of the operations of 1920 may be performed by a transmission monitoring component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    receiving a first index assigned to the UE of a plurality of different indexes;
    monitoring for a parameter that is distinct from the first index, the parameter indicating a single demodulation reference signal scheme of a plurality of available demodulation reference signal schemes for the UE to apply, the plurality of available demodulation reference signal schemes comprising a first demodulation reference signal scheme comprising an intra-symbol time domain orthogonal cover code scheme and a second demodulation reference signal scheme comprising a time domain cyclic shift scheme;
    receiving, based at least in part on the monitoring, the parameter indicating for the UE to use the first demodulation reference signal scheme;
    generating a transmission based at least in part on a $\pi/2$ binary phase shift keying modulation scheme; and
    transmitting, based at least in part on the first demodulation reference signal scheme, the transmission comprising a first demodulation reference signal generated using a first intra-symbol time domain orthogonal cover code in a first demodulation reference signal symbol period and a second demodulation reference signal generated using a second intra-symbol time domain orthogonal cover code in a second demodulation reference signal symbol period,
    wherein the first intra-symbol time domain orthogonal cover code, of a plurality of intra-symbol time domain orthogonal cover codes, is based at least in part on a symbol index of the first demodulation reference signal symbol period, the first index, and the parameter.

2. The method of claim 1, wherein a third intra-symbol time domain orthogonal cover code, a first cyclic shift for a third demodulation reference signal symbol period, and a second cyclic shift for a fourth demodulation reference signal symbol period is based at least in part on the first index.

3. The method of claim 2, wherein transmitting the transmission further comprises:
    transmitting a third demodulation reference signal using the third intra-symbol time domain orthogonal cover code having the first cyclic shift in the third demodulation reference signal symbol period; and
    transmitting a fourth demodulation reference signal using the third intra-symbol time domain orthogonal cover code having the second cyclic shift in the fourth demodulation reference signal symbol period, the first cyclic shift differing from the second cyclic shift.

4. The method of claim 1, wherein the first intra-symbol time domain orthogonal cover code for the first demodulation reference signal symbol period and the second intra-symbol time domain orthogonal cover code for the second demodulation reference signal symbol period are based at least in part on a symbol index of the second demodulation reference signal symbol period.

5. The method of claim 4, wherein the second intra-symbol time domain orthogonal cover code is based at least in part on the symbol index of the second demodulation reference signal symbol period and the first index.

6. The method of claim 1, wherein a first intra-symbol time domain orthogonal cover code hopping pattern of a plurality of intra-symbol time domain orthogonal cover code hopping patterns is based at least in part on the first index, the method further comprising:
transmitting a plurality of transmissions in accordance with the first intra-symbol time domain orthogonal cover code hopping pattern.

7. The method of claim 6, wherein the plurality of transmissions are a plurality of control channel transmissions.

8. The method of claim 6, wherein the plurality of transmissions are a plurality of shared data channel transmissions.

9. The method of claim 1, wherein transmitting the transmission further comprises:
transmitting a shared data channel transmission comprising a demodulation reference signal generated in accordance with the first demodulation reference signal scheme.

10. The method of claim 1, wherein transmitting the transmission further comprises:
transmitting a control channel transmission comprising a demodulation reference signal generated in accordance with the first demodulation reference signal scheme.

11. The method of claim 1, wherein the transmission is an uplink transmission to an access network entity.

12. The method of claim 1, wherein a defined demodulation reference signal scheme is based at least in part on the monitoring indicating that the parameter has not been received.

13. The method of claim 1, wherein an orthogonal demodulation reference signal sequence is generated by applying a third intra-symbol time domain orthogonal cover code or a time domain cyclic shift to a base demodulation reference signal sequence based at least in part on the first demodulation reference signal scheme.

14. The method of claim 1, wherein the parameter is a radio resource control parameter.

15. The method of claim 1, wherein the parameter is a radio resource control parameter that separately configures a demodulation reference signal scheme for a shared data channel and a demodulation reference signal scheme for a control channel.

16. The method of claim 1, wherein the first intra-symbol time domain orthogonal cover code is different from the second intra-symbol time domain orthogonal cover code.

17. The method of claim 1, wherein the first intra-symbol time domain orthogonal cover code is further based at least in part on an offset.

18. The method of claim 1, wherein:
the plurality of different indexes each correspond to one of a plurality of different intra-symbol time domain orthogonal cover codes comprising at least the first intra-symbol time domain orthogonal cover code and the second intra-symbol time domain orthogonal cover code; and
the UE generates the first demodulation reference signal using the first intra-symbol time domain orthogonal cover code in the first demodulation reference signal symbol period based at least in part on the first index assigned to the UE corresponding to the first intra-symbol time domain orthogonal cover code from the plurality of different intra-symbol time domain orthogonal cover codes.

19. An apparatus for wireless communication by a user equipment (UE), comprising:
a transmitter,
a processor,
memory in electronic communication with the processor, and
instructions stored in the memory and executable by the processor to cause the apparatus to:
receive a first index assigned to the UE of a plurality of different indexes;
monitor for a parameter that is distinct from the first index, the parameter indicating a single demodulation reference signal scheme of a plurality of available demodulation reference signal schemes for the UE to apply, the plurality of available demodulation reference signal schemes comprising a first demodulation reference signal scheme comprising an intra-symbol time domain orthogonal cover code scheme and a second demodulation reference signal scheme comprising a time domain cyclic shift scheme;
receiving, based at least in part on the monitoring, the parameter indicating for the UE to use the first demodulation reference signal scheme;
generate a transmission based at least in part on a $\pi/2$ binary phase shift keying modulation scheme; and
transmit, via the transmitter and based at least in part on the first demodulation reference signal scheme, the transmission comprising a first demodulation reference signal generated using a first intra-symbol time domain orthogonal cover code in a first demodulation reference signal symbol period and a second demodulation reference signal generated using a second intra-symbol time domain orthogonal cover code in a second demodulation reference signal symbol period,
wherein the first intra-symbol time domain orthogonal cover code, of a plurality of intra-symbol time domain orthogonal cover codes, is based at least in part on a symbol index of the first demodulation reference signal symbol period, the first index, and the parameter.

20. A method for wireless communication by an access network entity, comprising:
transmitting a first index assigned to a user equipment (UE) of a plurality of different indexes;
transmitting a parameter that is distinct from the first index, the parameter indicating a single demodulation reference signal scheme of a plurality of available demodulation reference signal schemes that the UE is to apply, the plurality of available demodulation reference signal schemes comprising a first demodulation reference signal scheme comprising an intra-symbol time domain orthogonal cover code scheme and a second demodulation reference signal scheme comprising a time domain cyclic shift scheme; and
monitoring for a transmission from the UE generated using the first demodulation reference signal scheme based at least in part on the parameter indicating for the UE to use the first demodulation reference signal scheme and generated based at least in part on a $\pi/2$ binary phase shift keying modulation scheme, the transmission comprising a first demodulation reference signal generated using a first intra-symbol time domain orthogonal cover code in a first demodulation reference signal symbol period and a second demodulation reference signal generated using a second intra-symbol time domain orthogonal cover code in a second demodulation reference signal symbol period,
wherein the first intra-symbol time domain orthogonal cover code is based at least in part on a symbol index of the first demodulation reference signal symbol period, the first index, and the parameter.

21. The method of claim 20, wherein the first index indicates a third intra-symbol time domain orthogonal cover code, a first cyclic shift for a third demodulation reference signal symbol period, and a second cyclic shift for a fourth demodulation reference signal symbol period.

22. The method of claim 21, wherein monitoring for the transmission further comprises:
receiving a third demodulation reference signal generated using the third intra-symbol time domain orthogonal cover code having the first cyclic shift in the third demodulation reference signal symbol period; and
receiving a fourth demodulation reference signal generated using the third intra-symbol time domain orthogonal cover code having the second cyclic shift in the fourth demodulation reference signal symbol period, the first cyclic shift differing from the second cyclic shift.

23. The method of claim 21, further comprising:
transmitting a second index assigned to a second UE of the plurality of different indexes that indicates a fourth intra-symbol time domain orthogonal cover code that differs from the third intra-symbol time domain orthogonal cover code.

24. The method of claim 20, wherein the first index indicates the first intra-symbol time domain orthogonal cover code for the first demodulation reference signal symbol period and the second intra-symbol time domain orthogonal cover code for the second demodulation reference signal symbol period based at least in part on a symbol index of the second demodulation reference signal symbol period.

25. The method of claim 24, wherein monitoring for the transmission further comprises:
receiving the first demodulation reference signal generated using the first intra-symbol time domain orthogonal cover code in the first demodulation reference signal symbol period; and
receiving the second demodulation reference signal generated using the second intra-symbol time domain orthogonal cover code in the second demodulation reference signal symbol period.

26. The method of claim 20, wherein monitoring for the transmission further comprises:
receiving a shared data channel transmission comprising a demodulation reference signal generated in accordance with the first demodulation reference signal scheme; and
demodulating the shared data channel transmission based at least in part on the demodulation reference signal.

27. The method of claim 20, wherein monitoring for the transmission further comprises:
receiving a control channel transmission comprising a demodulation reference signal generated in accordance with the first demodulation reference signal scheme; and
demodulating the control channel transmission based at least in part on the demodulation reference signal.

28. An apparatus for wireless communication by an access network entity, comprising:
a transmitter,
a processor,
memory in electronic communication with the processor, and
instructions stored in the memory and executable by the processor to cause the apparatus to:
transmit a first index assigned to a user equipment (UE) of a plurality of different indexes;
transmit, via the transmitter, a parameter that is distinct from the first index, the parameter indicating a single demodulation reference signal scheme of a plurality of available demodulation reference signal schemes that the UE is to apply, the plurality of available demodulation reference signal schemes comprising a first demodulation reference signal scheme comprising an intra-symbol time domain orthogonal cover code scheme and a second demodulation reference signal scheme comprising a time domain cyclic shift scheme; and
monitor for a transmission from the UE generated based at least in part on the first demodulation reference signal scheme and generated based at least in part on a $\pi/2$ binary phase shift keying modulation scheme, the transmission comprising a first demodulation reference signal generated using a first intra-symbol time domain orthogonal cover code in a first demodulation reference signal symbol period and a second demodulation reference signal generated using a second intra-symbol time domain orthogonal cover code in a second demodulation reference signal symbol period,
wherein the first intra-symbol time domain orthogonal cover code is based at least in part on a symbol index of the first demodulation reference signal symbol period, the first index, and the parameter.

* * * * *